US010545072B2

(12) United States Patent
Monna et al.

(10) Patent No.: US 10,545,072 B2
(45) Date of Patent: Jan. 28, 2020

(54) CATALYST DEGRADATION DIAGNOSTIC METHOD AND CATALYST DEGRADATION DIAGNOSTIC SYSTEM

(71) Applicant: NGK INSULATORS, LTD., Nagoya-shi, Aichi (JP)

(72) Inventors: Kosuke Monna, Frankfurt am Main (DE); Taku Okamoto, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 147 days.

(21) Appl. No.: 15/869,507

(22) Filed: Jan. 12, 2018

(65) Prior Publication Data

US 2018/0209873 A1    Jul. 26, 2018

(30) Foreign Application Priority Data

Jan. 23, 2017   (JP) ................. 2017-009336

(51) Int. Cl.
*F01N 11/00*   (2006.01)
*F01N 3/20*    (2006.01)
(Continued)

(52) U.S. Cl.
CPC ........... *G01M 15/102* (2013.01); *F01N 3/103* (2013.01); *F01N 3/106* (2013.01); *F01N 2550/02* (2013.01); *F01N 2900/1621* (2013.01)

(58) Field of Classification Search
CPC ..... G01M 15/102; G01M 15/10; F01N 3/106; F01N 11/00; F01N 2550/02; F01N 2900/1402; F01N 3/103; F01N 2560/06; F01N 2900/1621; F01N 2560/023; F01N 2560/02; F01N 2560/20; F01N 13/008; F01N 2550/00; F01N 11/002; F01N 2370/02; F01N 2570/10; F01N 2900/1602; F01N 2560/025; F01N 3/10; F01N 2570/12; F02D 41/1459; F02D 41/0235;
(Continued)

(56) References Cited

U.S. PATENT DOCUMENTS 6,797,517 B1 *   9/2004   Hoshi ................. F01N 3/0807
                                                        422/105
2004/0000135 A1 *  1/2004   Uchida ................ F01N 3/101
                                                         60/277
(Continued)

FOREIGN PATENT DOCUMENTS

JP    2016-108979 A    6/2016

*Primary Examiner* — Brandi N Hopkins
(74) *Attorney, Agent, or Firm* — Mattingly & Malur, PC

(57) ABSTRACT

A method of diagnosing a degree of degradation of a catalyst located along an exhaust path of an internal combustion engine, and oxidizing or adsorbing a target gas included in an exhaust gas and including at least one of HC and CO is disclosed. The method includes: a) determining whether an oxygen concentration of the exhaust gas is in a range of 15% to 20% or whether the oxygen concentration is 10% or more and varies in a range of ±2% or less of a predetermined value in a predetermined period of time; and b) diagnosing whether the catalyst is degraded when criteria in the step a) are satisfied. The step b) is performed by comparing a diagnostic indicator value calculated using an output value from a target gas detection component provided at a location downstream from the catalyst and a threshold corresponding to temperature of the catalyst.

18 Claims, 10 Drawing Sheets

(51) Int. Cl.
*G01M 15/10* (2006.01)
*F01N 3/10* (2006.01)

(58) Field of Classification Search
CPC . F02D 41/1446; Y02T 10/47; G01N 27/4071;
G01N 27/4075; G01N 27/4067; G01N
27/41
See application file for complete search history.

(56) References Cited

U.S. PATENT DOCUMENTS

| | | | |
|---|---|---|---|
| 2014/0060012 A1* | 3/2014 | Kakimoto | F01N 11/00 60/277 |
| 2016/0161370 A1* | 6/2016 | Nakasone | G01M 15/102 73/114.75 |
| 2016/0161371 A1* | 6/2016 | Nakasone | G01M 15/102 73/114.75 |
| 2017/0276051 A1* | 9/2017 | Monna | B01D 53/944 |
| 2017/0276052 A1* | 9/2017 | Monna | F01N 11/002 |
| 2018/0010506 A1* | 1/2018 | Monna | F01N 3/10 |
| 2018/0128771 A1* | 5/2018 | Okamoto | F01N 13/008 |

* cited by examiner

CATALYST DEGRADATION DIAGNOSTIC METHOD AND CATALYST DEGRADATION DIAGNOSTIC SYSTEM

BACKGROUND OF THE INVENTION

Field of the Invention

The present invention relates to a method of diagnosing a degree of degradation of a catalyst oxidizing or adsorbing an unburned hydrocarbon gas.

Description of the Background Art

As a technique of diagnosing a degree of degradation of a catalyst (an oxidation catalyst) that is located along an exhaust path of an internal combustion engine, such as an engine of a vehicle, and oxidizes or adsorbs a target gas including at least one of a hydrocarbon gas and a carbon monoxide gas included in an exhaust gas from the internal combustion engine, for example, a technique of obtaining the concentration of the target gas at a location downstream from the catalyst on the exhaust path at any timing at which the internal combustion engine is in a normal operation state, and comparing a value of the concentration and a determined threshold to diagnose whether the catalyst is degraded to a degree beyond an allowable degree is already known (see, for example, Japanese Patent Application Laid-Open Publication No. 2016-108979). The technique is referred to as Passive OBD in Japanese Patent Application Laid-Open Publication No. 2016-108979.

In the technique of the Passive OBD disclosed in Japanese Patent Application Laid-Open Publication No. 2016-108979, a mixed potential hydrocarbon gas sensor (HC sensor) is used to detect the target gas. While an oxygen concentration of an exhaust gas exhausted from the internal combustion engine can vary with an operation state of the internal combustion engine, an output from the HC sensor can vary with the oxygen concentration of a measurement gas. Intensive studies made by the inventors of the present invention have revealed that it is preferable to eliminate the effect of the variation of the oxygen concentration of the exhaust gas as much as possible to diagnose degradation of the catalyst with high accuracy using the technique of the Passive OBD disclosed in Japanese Patent Application Laid-Open Publication No. 2016-108979.

Japanese Patent Application Laid-Open Publication No. 2016-108979 mentions that the oxygen concentration of the exhaust gas exhausted from the internal combustion engine is approximately 10% and the Passive OBD is made when the internal combustion engine is in a normal or steady operation state, but fails to particularly consider a specific effect of the variation of the oxygen concentration on diagnosis of degradation of the catalyst.

SUMMARY

The present invention is directed to a method of diagnosing a degree of degradation of a catalyst that oxidizes or adsorbs an unburned hydrocarbon gas, and relates, in particular, to diagnosis when the oxygen concentration of the exhaust gas varies.

The present invention is a method of diagnosing a degree of degradation of a catalyst that is located along an exhaust path of an internal combustion engine, and oxidizes or adsorbs a target gas including at least one of a hydrocarbon gas and a carbon monoxide gas included in an exhaust gas from the internal combustion engine. According to the present invention, the method includes a) determining whether an oxygen concentration of the exhaust gas specified by a predetermined oxygen concentration specification component is in a range of 15% to 20% or whether the oxygen concentration of the exhaust gas is 10% or more and varies in a range of ±2% or less of a predetermined value in a predetermined period of time; and b) diagnosing whether the catalyst is degraded beyond an allowable degree at the time when it is determined in the step a) that the oxygen concentration of the exhaust gas is in the range of 15% to 20% or that the oxygen concentration of the exhaust gas is 10% or more and varies in the range of ±2% or less of the predetermined value in the predetermined period of time. The step b) is performed by comparing a diagnostic indicator value calculated using an output value from a target gas detection component and a threshold corresponding to temperature of the catalyst. The target gas detection component is provided at least at a location downstream from the catalyst on the exhaust path and is capable of detecting the target gas.

According to the present invention, even when the oxygen concentration of the exhaust gas varies, a degree of degradation of a catalytic ability of the catalyst that oxidizes or adsorbs the target gas including at least one of the hydrocarbon gas and the carbon monoxide gas can be diagnosed with stability and high accuracy.

An object of the present invention is thus to provide a technique of diagnosing degradation of the catalyst with stability and high accuracy while reducing the effect of the variation of the oxygen concentration of the exhaust gas.

These and other objects, features, aspects and advantages of the present invention will become more apparent from the following detailed description of the present invention when taken in conjunction with the accompanying drawings.

DESCRIPTION OF THE PREFERRED EMBODIMENTS

<Overview of System>

Figure 1:
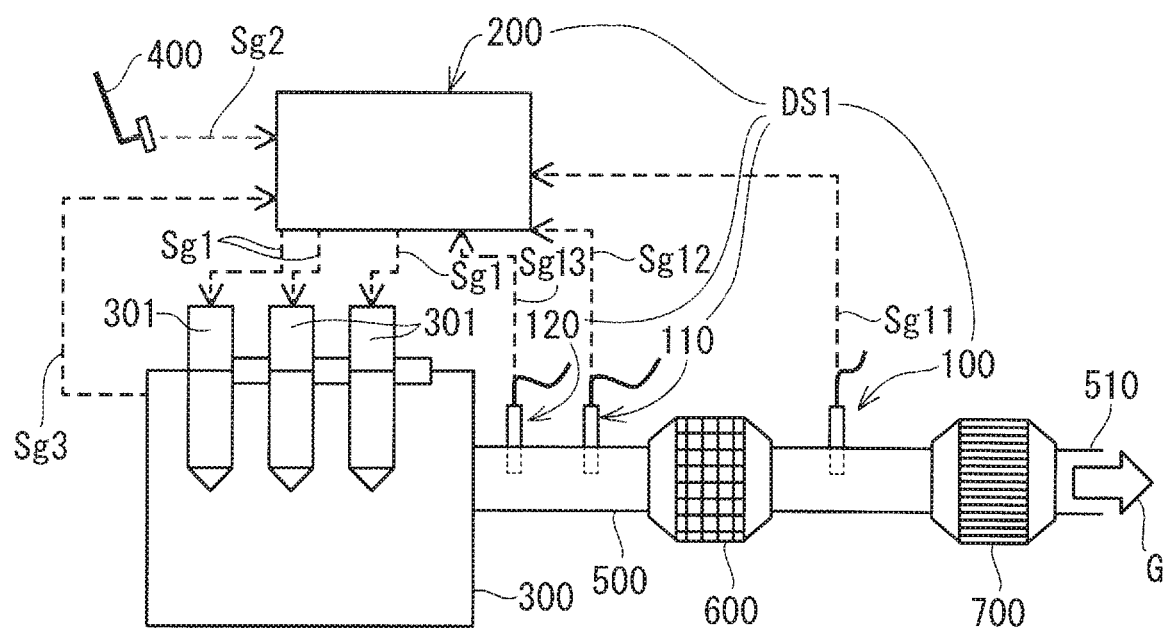
FIG. 1 shows schematic configuration of a diesel engine system 1000 including an oxidation catalyst diagnostic system DS1.

FIG. 1 shows schematic configuration of a diesel engine system (hereinafter, also simply referred to as an engine system) 1000 including an oxidation catalyst diagnostic system DS1 according to an embodiment of the present invention.

The oxidation catalyst diagnostic system DS1 mainly includes a hydrocarbon gas sensor (hereinafter, also referred to as an HC sensor) 100, a temperature sensor 110, an oxygen concentration specification sensor 120, and an electronic controller 200 that is a controller for controlling an operation of the entire engine system 1000.

The engine system 1000 mainly includes, in addition to the oxidation catalyst diagnostic system DS1, an engine main body 300 that is a diesel engine of one type of an internal combustion engine, a plurality of fuel injection valves 301 that inject fuel into the engine main body 300, a fuel injection instruction part 400 for instructing the fuel injection valves 301 to inject the fuel, an exhaust pipe 500 forming an exhaust path that externally discharges an exhaust gas (engine exhaust) G generated in the engine main body 300, and an oxidation catalyst 600, such as platinum and palladium, that is located along the exhaust pipe 500, and oxidizes or adsorbs an unburned hydrocarbon gas in the exhaust gas G. In the present embodiment, in a relative meaning, the position closer to the engine main body 300 that is one side of the exhaust pipe 500 is referred to as an upstream side, and the position closer to an exhaust port 510 that is opposite the engine main body 300 is referred to as a downstream side.

The engine system 1000 is typically mounted on a vehicle, and in such a case, the fuel injection instruction part 400 is an accelerator pedal.

In the engine system 1000, the electronic controller 200 issues a fuel injection instruction signal sg1 to the fuel injection valves 301. The fuel injection instruction signal sg1 is usually issued in response to a fuel injection request signal sg2 for demanding an injection of a predetermined amount of fuel, which is provided from the fuel injection instruction part 400 to the electronic controller 200 during the operation (action) of the engine system 1000 (e.g., an accelerator pedal is depressed so that an optimum fuel injection reflecting a large number of parameters, such as the position of an accelerator, an intake oxygen amount, an engine speed, and torque is demanded). In addition to this, the fuel injection instruction signal sg1 is issued for operation of the oxidation catalyst diagnostic system DS1.

A monitor signal sg3 for monitoring various situations inside the engine main body 300 is provided from the engine main body 300 to the electronic controller 200.

In the engine system 1000, the exhaust gas G exhausted from the engine main body 300 that is a diesel engine is a gas in an excessive $O_2$ (oxygen) atmosphere having an oxygen concentration of approximately 5% to 20%. Specifically, the exhaust gas G contains, in addition to oxygen and the unburned hydrocarbon gas, nitrogen oxides, soot (graphite), and the like. In this specification, the unburned hydrocarbon gas that is a gas (target gas) to be adsorbed or oxidized by the oxidation catalyst 600 includes not only typical hydrocarbon gases (classified as hydrocarbons by a chemical formula), such as $C_2H_4$, $C_3H_6$, and n-C8, but also carbon monoxide (CO). The HC sensor 100 can suitably detect the target gas, including CO. However, $CH_4$ is excluded.

The engine system 1000 may include, in addition to the oxidation catalyst 600, one or more other purifying apparatuses 700 located along the exhaust pipe 500.

The oxidation catalyst diagnostic system DS1 is a catalyst degradation diagnostic system for diagnosing a degree of degradation of the oxidation catalyst 600 (more specifically, a degree of degradation of a catalytic ability of the oxidation catalyst 600). The oxidation catalyst 600 adsorbs or oxidizes the unburned hydrocarbon gas of the exhaust gas G flowing downstream to prevent or reduce the flow of the unburned hydrocarbon gas out of the exhaust port 510 at the end of the exhaust pipe 500, and the catalytic ability (specifically, an adsorbing ability and an oxidizing ability) of the oxidation catalyst 600 is degraded over time. The degradation is not preferable as the amount of the unburned hydrocarbon gas flowing downstream without being captured by the oxidation catalyst 600 increases. In the oxidation catalyst diagnostic system DS1 according to the present embodiment, the unburned hydrocarbon gas having passed through the oxidation catalyst 600 is detected using the HC sensor 100 to diagnose the degree of degradation of the catalytic ability of the oxidation catalyst 600.

As described above, the oxidation catalyst diagnostic system DS1 includes the HC sensor 100, the temperature sensor 110, and the oxygen concentration specification sensor 120. The HC sensor 100 is provided at a location downstream from the oxidation catalyst 600 along the exhaust pipe 500, and detects the concentration of the unburned hydrocarbon gas at the location, the temperature sensor 110 is provided at a location upstream from the oxidation catalyst 600, and detects the temperature of the exhaust gas G (an exhaust temperature) at the location, and the oxygen concentration specification sensor 120 detects $O_2$ (oxygen) included in the exhaust gas G. Although the oxygen concentration specification sensor 120 is provided at a location upstream from the oxidation catalyst 600 along the exhaust pipe 500 in FIG. 1, the oxygen concentration specification sensor 120 may not necessarily be provided at the location upstream from the oxidation catalyst 600, and may be provided at a location downstream from the oxidation catalyst 600. This is because the oxidation catalyst 600 has no effect on $O_2$ in the exhaust gas G passing through the oxidation catalyst 600. One end portion of the HC sensor 100, one end portion of the temperature sensor 110, and one end portion of the oxygen concentration specification sensor 120 have each been inserted in the exhaust pipe 500.

Generally speaking, in the oxidation catalyst diagnostic system DS1, the electronic controller 200 diagnoses whether the oxidation catalyst 600 is degraded based on an HC detection signal sg11 issued from the HC sensor 100 and an exhaust temperature detection signal sg12 issued from the temperature sensor 110, when the oxygen concentration of the exhaust gas G specified based on an oxygen detection signal sg13 issued from the oxygen concentration specification sensor 120 is in a predetermined range. An example of the configuration of the HC sensor 100 and details of the diagnosis of degradation will be described below. On the other hand, any known temperature sensor, including a temperature sensor used in a typical engine system to measure the exhaust temperature, may be used as the temperature sensor 110.

As the oxygen concentration specification sensor 120, a known oxygen sensor may be used as a dedicated sensor, or an oxygen sensor used for another purpose may commonly be used. Alternatively, in view of the fact that a NOx sensor for measuring a NOx concentration of the exhaust gas G can output a signal proportional to the oxygen concentration, the NOx sensor may be used as the oxygen concentration specification sensor 120. In any case, the electronic controller 200 specifies the oxygen concentration using a known method based on the oxygen detection signal sg13 (an electromotive force value or a current value) output from the oxygen concentration specification sensor 120 in accordance with the oxygen concentration of the exhaust gas G.

The electronic controller 200 includes a storage (not illustrated), such as memory and an HDD, and the storage stores a program for controlling the operation of the engine system 1000 and the oxidation catalyst diagnostic system DS1, threshold data used when the degree of degradation of the oxidation catalyst 600 is diagnosed, which will be described below, and the like.

<Example of Configuration of HC Sensor>

Figure 2:
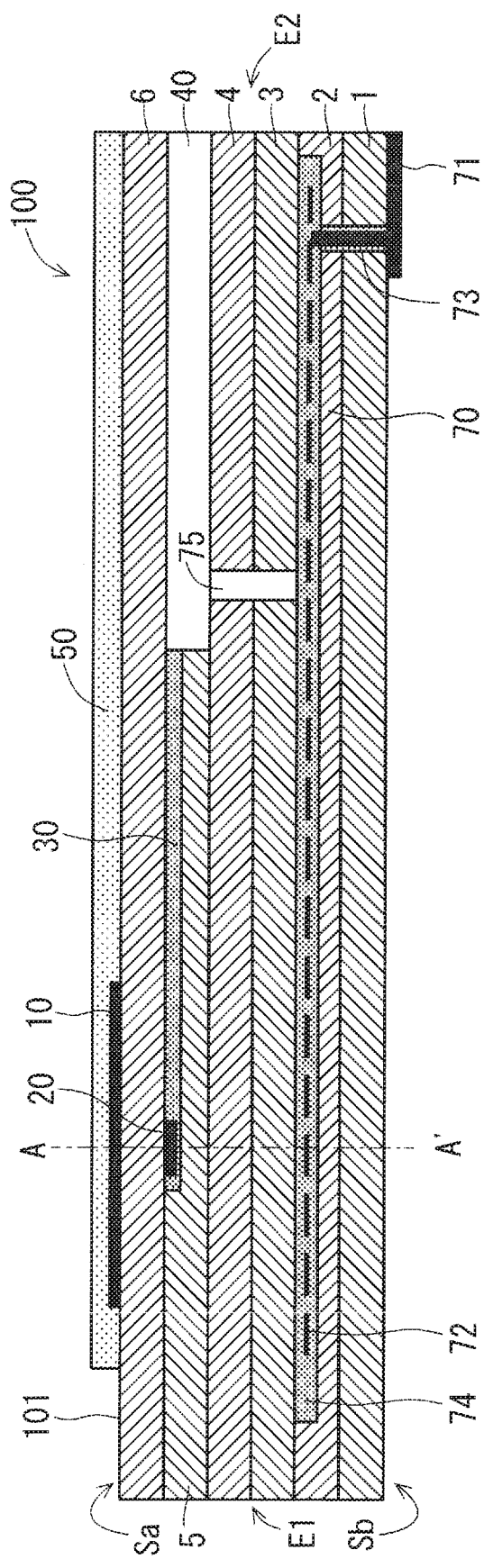
FIGS. 2A and 2B are schematic sectional views each schematically showing an example of the configuration of an HC sensor 100.

FIGS. 2A and 2B are schematic sectional views each schematically showing an example of the configuration of the HC sensor 100 used in the present embodiment. FIG. 2A is a vertical sectional view taken along the longitudinal direction of a sensor element 101, which is a main component of the HC sensor 100. FIG. 2B is a diagram including a cross section perpendicular to the longitudinal direction of the sensor element 101 taken along the line A-A' of FIG. 2A.

The HC sensor 100 used in the present embodiment is a so-called mixed potential gas sensor. Generally speaking, the HC sensor 100 uses a potential difference occurring between a detection electrode 10 located on the surface of the sensor element 101 mainly including a ceramic, which is an oxygen-ion conductive solid electrolyte, such as zirconia ($ZrO_2$), and a reference electrode 20 located inside the sensor element 101 due to the difference in concentration of a gas component to be measured near the detection electrode 10 and the reference electrode 20 based on the principle of mixed potential to obtain the concentration of the gas component of a measurement gas.

When the measurement gas includes a plurality of types of the unburned hydrocarbon gas, the potential difference occurring between the detection electrode 10 and the reference electrode 20 has a value to which all the plurality of types of the unburned hydrocarbon gas contribute, and thus a value of the obtained concentration is the sum of the concentrations of the plurality of types of the unburned hydrocarbon gas.

The sensor element 101 mainly includes, in addition to the detection electrode 10 and the reference electrode 20 described above, a reference gas introduction layer 30, a reference gas introduction space 40, and a surface protective layer 50.

In the present embodiment, the sensor element 101 has a structure in which six layers, namely, a first solid electrolyte layer 1, a second solid electrolyte layer 2, a third solid electrolyte layer 3, a fourth solid electrolyte layer 4, a fifth solid electrolyte layer 5, and a sixth solid electrolyte layer 6, each formed of an oxygen-ion conductive solid electrolyte, are laminated in the stated order from the bottom side of FIGS. 2A and 2B, and includes other components located mainly between these layers or on an outer peripheral surface of the element. Solid electrolytes forming these six layers are dense and airtight. The sensor element 101 is manufactured, for example, by performing predetermined machining and printing of circuit patterns with respect to ceramic green sheets corresponding to respective layers, then laminating these green sheets, and further firing the laminated green sheets for integration.

In the following description, an upper surface of the sixth solid electrolyte layer 6 is referred to as a front surface Sa of the sensor element 101, and a lower surface of the first solid electrolyte layer 1 is referred to as a rear surface Sb of the sensor element 101 in FIGS. 2A and 2B for convenience sake. When the concentration of the unburned hydrocarbon gas of the measurement gas is obtained using the HC sensor 100, the HC sensor 100 is located so that a predetermined range of the sensor element 101 at least including the detection electrode 10 from a distal end E1 as one end of the sensor element 101 is located in a measurement gas atmosphere, and the other portion of the sensor element 101 including a proximal end E2 as the other end of the sensor element 101 is not in contact with the measurement gas atmosphere.

The detection electrode 10 is an electrode for detecting the measurement gas. The detection electrode 10 is formed as a porous cermet electrode made of Pt containing a predetermined ratio of Au, namely, a Pt—Au alloy, and zirconia. The detection electrode 10 is located on a portion of the front surface Sa of the sensor element 101 closer to the distal end E1 as one end, in the longitudinal direction, of the sensor element 101 to be approximately rectangular in plan view.

The composition of the Pt—Au alloy of the detection electrode 10 is suitably set, so that the detection electrode 10 has catalytic activity inactivated for the unburned hydrocarbon gas. This means that a decomposition reaction of the unburned hydrocarbon gas in the detection electrode 10 is prevented or reduced. Thus, in the HC sensor 100, the potential of the detection electrode 10 selectively varies for (has correlation with) the unburned hydrocarbon gas in accordance with the concentration thereof. In other words, the detection electrode 10 is provided to have high concentration dependence of the potential for the unburned hydrocarbon gas while having low concentration dependence of the potential for other components of the measurement gas. This is achieved by including, in addition to platinum (Pt) as a main component, gold (Au) as a conductive component (a noble metal component) of the detection electrode 10.

Specifically, the detection electrode 10 is formed to have an abundance ratio of Au (Au abundance ratio) of 0.3 or more. The detection electrode 10 is formed in the manner so that the HC sensor 100 has high detection sensitivity compared with a case where the detection electrode 10 is formed as a cermet electrode made of Pt and zirconia as with the reference electrode 20. With this structure, when the unburned hydrocarbon gas included in the exhaust gas G in the excessive oxygen atmosphere generated in the engine main body 300 as described above is a target of detection, the HC sensor 100 can detect the unburned hydrocarbon gas with favorable detection sensitivity.

In this specification, the Au abundance ratio means an area ratio of a portion covered with Au to a portion at which Pt is exposed in the surface of noble metal particles included in the detection electrode 10. The Au abundance ratio is one when the area of the portion at which Pt is exposed and the area of the portion covered with Au are equal to each other. In this specification, the Au abundance ratio is calculated using a relative sensitivity coefficient method from a peak intensity of a peak detected for Au and Pt obtained by X-ray photoelectron spectroscopy (XPS).

When the detection electrode 10 has an Au abundance ratio of 0.3 or more, Au is concentrated in the surface of the noble metal particles included in the detection electrode 10. More specifically, an Au-rich Pt—Au alloy is formed near the surfaces of Pt-rich Pt—Au alloy particles. When the state is achieved, the detection electrode 10 has suitably inactivated catalytic activity, and has increased unburned hydrocarbon gas concentration dependence of the potential.

The volume ratio of noble metal components to zirconia in the detection electrode 10 is approximately 5:5 to 8:2.

The detection electrode 10 preferably has a porosity of 10% or more and 30% or less and a thickness of 5 μm or more to cause the HC sensor 100 to suitably express its function. In particular, the detection electrode 10 more preferably has a porosity of 15% or more and 25% or less and a thickness of 25 μm or more and 45 μm or less.

Although a planar size of the detection electrode 10 may be set appropriately, the size in the longitudinal direction of the sensor element is approximately 0.2 mm to 10 mm, and a size in a direction perpendicular to the longitudinal direction of the sensor element is approximately 1 mm to 5 mm, for example.

The reference electrode 20 is an electrode that is located inside the sensor element 101, is used as a reference when the concentration of the measurement gas is obtained, and is approximately rectangular in plan view. The reference electrode 20 is formed as a porous cermet electrode made of Pt and zirconia.

The reference electrode 20 is formed to have a porosity of 10% or more and 30% or less and a thickness of 5 μm or more and 15 μm or less. A planar size of the reference electrode 20 may be smaller than that of the detection electrode 10 as illustrated in FIGS. 2A and 2B, or may be similar to that of the detection electrode 10.

The reference gas introduction layer 30 is a layer formed of porous alumina located inside the sensor element 101 to cover the reference electrode 20, and the reference gas introduction space 40 is an internal space located closer to the proximal end E2 of the sensor element 101. Atmospheric air (oxygen) as a reference gas when the unburned hydrocarbon gas concentration is obtained is externally introduced into the reference gas introduction space 40.

The reference gas introduction space 40 and the reference gas introduction layer 30 communicate with each other, so that the surroundings of the reference electrode 20 are always filled with the atmospheric air (oxygen) through the reference gas introduction space 40 and the reference gas introduction layer 30 when the HC sensor 100 is used. The reference electrode 20 thus always has a constant potential when the HC sensor 100 is used.

The reference gas introduction space 40 and the reference gas introduction layer 30 are prevented from being in contact with the measurement gas by the surrounding solid electrolytes, so that the reference electrode 20 is not in contact with the measurement gas even when the detection electrode 10 is exposed to the measurement gas.

In a case illustrated in FIG. 2A, the reference gas introduction space 40 is provided so that a part of the fifth solid electrolyte layer 5 is caused to be a space communicating with the outside at the location closer to the proximal end E2 of the sensor element 101. The reference gas introduction layer 30 is provided between the fifth solid electrolyte layer 5 and the sixth solid electrolyte layer 6 to extend in the longitudinal direction of the sensor element 101. The reference electrode 20 is located below the center of gravity of the detection electrode 10 in FIG. 2A.

The surface protective layer 50 is a porous layer formed of alumina located on the front surface Sa of the sensor element 101 to at least cover the detection electrode 10. The surface protective layer 50 is provided as an electrode protective layer for preventing or reducing degradation of the detection electrode 10 caused by continuous exposure to the measurement gas when the HC sensor 100 is used. In a case illustrated in FIGS. 2A and 2B, the surface protective layer 50 is provided to cover not only the detection electrode 10 but also the almost entire front surface Sa of the sensor element 101 except for a predetermined range from the distal end E1 of the sensor element 101.

As illustrated in FIG. 2B, the HC sensor 100 includes a potentiometer 60 that can measure a potential difference between the detection electrode 10 and the reference electrode 20. Although wiring between the detection electrode 10 and the potentiometer 60 and between the reference electrode 20 and the potentiometer 60 is simplified in FIG. 2B, in the actual sensor element 101, connection terminals (not illustrated) are located on a portion of the front surface Sa or the rear surface Sb closer to the proximal end E2 to correspond to the respective electrodes, and wiring patterns (not illustrated) connecting the electrodes to the corresponding connection terminals are formed on the front surface Sa and inside the element. The detection electrode 10 and the reference electrode 20 are each electrically connected to the potentiometer 60 through the wiring patterns and the connection terminals. In the present embodiment, the potential difference between the detection electrode 10 and the reference electrode 20 measured by the potentiometer 60 is the HC detection signal sg11. The potential difference is also referred to as an HC sensor output.

The sensor element 101 further includes a heater part 70 playing a role in temperature adjustment of heating the sensor element 101 and keeping it warm to enhance the oxygen ion conductivity of the solid electrolytes. The heater part 70 includes a heater electrode 71, heaters 72, a through hole 73, a heater insulating layer 74, and a pressure diffusion hole 75.

The heater electrode 71 is an electrode formed to be in contact with the rear surface Sb of the sensor element 101 (the lower surface of the first solid electrolyte layer 1 in FIGS. 2A and 2B). The heater electrode 71 is to be connected to an external power supply (not illustrated) to enable the heater part 70 to be externally powered.

The heaters 72 are electric resistors located inside the sensor element 101. The heaters 72 are connected to the heater electrode 71 via the through hole 73, and generate heat by being externally powered through the heater electrode 71 to heat the solid electrolytes forming the sensor element 101 and keep them warm.

In the case illustrated in FIGS. 2A and 2B, the heaters 72 are buried across a region extending from the proximal end E2 to the location below the detection electrode 10 close to the distal end E1 to be vertically sandwiched between the second solid electrolyte layer 2 and the third solid electrolyte layer 3. The heaters 72 can thus adjust the sensor element 101 as a whole to a temperature at which the solid electrolytes are activated.

The heater insulating layer 74 is an insulating layer formed of an insulator, such as alumina, on upper and lower surfaces of the heaters 72. The heater insulating layer 74 is formed for electrical insulation between the second solid electrolyte layer 2 and the heaters 72 and for electrical insulation between the third solid electrolyte layer 3 and the heaters 72.

The pressure diffusion hole 75 is a part provided to penetrate the third solid electrolyte layer 3 and the fourth solid electrolyte layer 4 to communicate with the reference gas introduction space 40, and is formed to mitigate an internal pressure rise associated with a temperature rise in the heater insulating layer 74.

When the unburned hydrocarbon gas concentration of the exhaust gas G from the engine main body 300 as the measurement gas is obtained using the HC sensor 100 having configuration as described above, the HC sensor 100 is located so that only the predetermined range of the sensor element 101 at least including the detection electrode 10 from the distal end E1 is inserted in the exhaust pipe 500 of the engine system 1000, while the portion of the sensor element 101 closer to the proximal end E2 is isolated from the space as described above, and the atmospheric air (oxygen) is supplied to the reference gas introduction space 40. The heaters 72 heat the sensor element 101 to an appropriate temperature of 300° C. to 800° C., preferably to 400° C. to 700° C., and more preferably to 400° C. to 600° C.

In this state, a potential difference occurs between the detection electrode 10, which is exposed to the measurement gas (exhaust gas G), and the reference electrode 20, which is located in the atmospheric air. As described above, however, the potential of the detection electrode 10 selectively has concentration dependence for the unburned hydrocarbon gas of the measurement gas (exhaust gas G) while the potential of the reference electrode 20 located under the atmosphere of the atmospheric air (having a constant oxygen concentration) is maintained constant, and thus the potential difference (HC sensor output) has a value substantially corresponding to the concentration of the measurement gas around the detection electrode 10. The unburned hydrocarbon gas concentration and the sensor output thus have a constant functional relationship (referred to as sensitivity characteristics). The unburned hydrocarbon gas concentration of the measurement gas can be obtained using the sensitivity characteristics.

That is to say, the sensitivity characteristics are experimentally specified by measuring the sensor output in advance using, as the measurement gas, a plurality of different mixed gases having known unburned hydrocarbon gas concentrations, and the sensitivity characteristics are stored in the electronic controller 200. The electronic controller 200 converts the HC sensor output varying moment by moment depending on the unburned hydrocarbon gas concentration of the measurement gas into the unburned hydrocarbon gas concentration based on the sensitivity characteristics, thereafter to obtain the unburned hydrocarbon gas concentration at the location downstream from the oxidation catalyst 600 approximately in real time.

Furthermore, in the present embodiment, a variation of a value of the HC sensor output (value of the potential difference) provided as the HC detection signal sg11 is used in diagnosis of degradation, as will be described below.

<Characteristics of Oxidation Catalyst>

Characteristics of the oxidation catalyst 600 as a target of diagnosis of degradation made in the oxidation catalyst diagnostic system DS1 according to the present embodiment will be described next.

Figure 3:
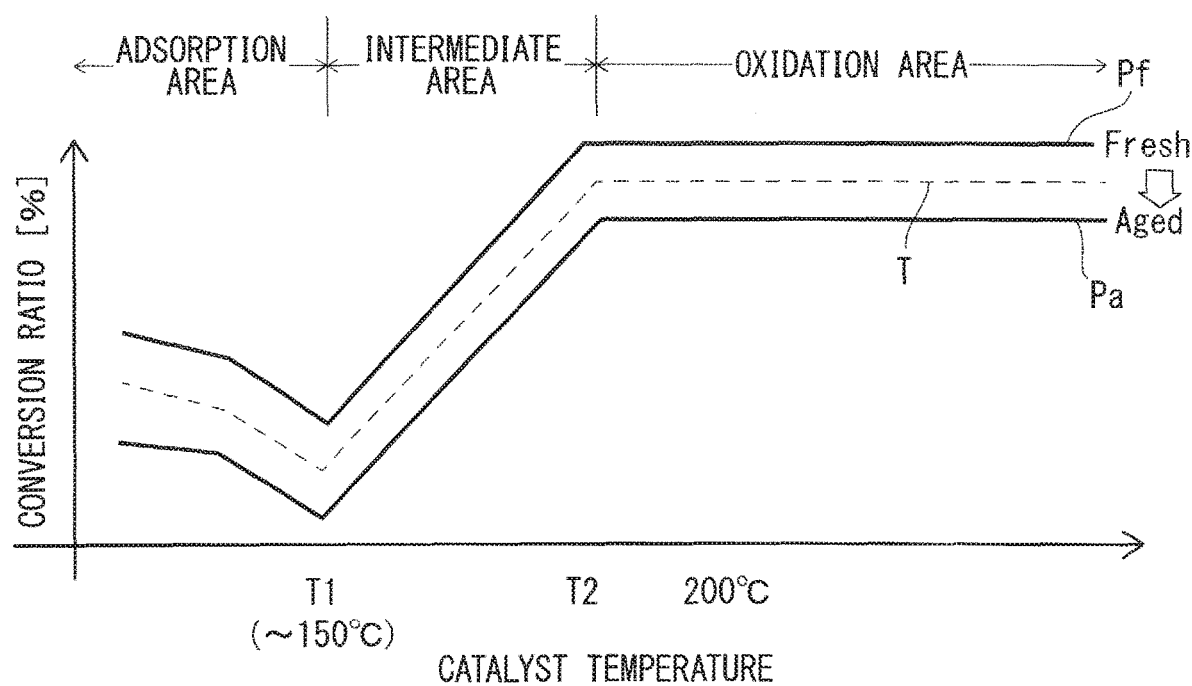
FIG. 3 schematically shows a conversion ratio profile.

FIG. 3 schematically shows a relationship (conversion ratio profile) between the temperature of the oxidation catalyst 600 (a catalyst temperature) and a conversion ratio.

FIG. 3 schematically shows a conversion ratio profile Pf of the oxidation catalyst 600 in an initial stage of use (an unused oxidation catalyst or an oxidation catalyst just having been started to be used) (referred to as a Fresh one or simply referred to as a Fresh) and a conversion ratio profile Pa of the oxidation catalyst 600 having been used for a certain period of time (referred to as an Aged one or simply referred to as an Aged).

The conversion ratio is a value serving as an indicator of the catalytic ability of the oxidation catalyst 600, and, when the concentration of the unburned hydrocarbon gas near an upstream side of the oxidation catalyst 600 is defined as an upstream unburned hydrocarbon gas concentration Nu (hereinafter, also referred to as an upstream concentration Nu) and the concentration of the unburned hydrocarbon gas near a downstream side of the oxidation catalyst 600 is defined as a downstream unburned hydrocarbon gas concentration Nl (hereinafter, also referred to as a downstream concentration Nl), the conversion ratio is defined by the following Equation (1):

$$\text{conversion ratio (\%)} = 100 \times (Nu - Nl)/Nu \quad \text{Equation (1)}$$

That is to say, the conversion ratio represents a ratio of the unburned hydrocarbon gas not flowing downstream from the oxidation catalyst 600 to the unburned hydrocarbon gas flowing into the oxidation catalyst 600 from the upstream side. The oxidation catalyst 600 having a higher conversion ratio has a higher catalytic ability.

More specifically, the oxidation catalyst 600 mainly has an effect (the adsorbing ability) to adsorb the unburned hydrocarbon gas in a temperature range (an adsorption area in FIG. 3) equal to or lower than a certain temperature T1 (approximately 150° C.), and suitably demonstrates the ability (oxidizing ability) to oxidize the unburned hydrocarbon gas as its original function in a temperature range (an oxidation area in FIG. 3) equal to or higher than a certain temperature T2 (usually between 150° C. and 200° C.). In a temperature range (an intermediate area in FIG. 3) between the temperature T1 and the temperature T2, the adsorbing ability decreases and the oxidizing ability increases with increasing temperature. It can thus be said that the conversion ratio is a value representing a ratio of the unburned hydrocarbon gas adsorbed or oxidized by the oxidation catalyst 600 to the unburned hydrocarbon gas flowing into the oxidation catalyst 600 from the upstream side.

As shown in FIG. 3, the conversion ratio profile Pf of the Fresh one usually has the highest conversion ratio (of approximately 90%) in the oxidation area, and has a lower conversion ratio in the adsorption area than in the oxidation area. The conversion ratio is the lowest at the temperature T1 (approximately 150° C.), which is an upper limit temperature in the adsorption area, and tends to increase with increasing temperature in the intermediate area.

The temperature of the oxidation catalyst 600, however, can vary moment by moment depending on the temperature of the exhaust gas G (exhaust temperature) exhausted from the engine main body 300 and flowing into the oxidation catalyst 600 through the exhaust pipe 500, and thus an actual conversion ratio varies moment by moment.

The oxidation catalyst 600, which has a high conversion ratio when it is a Fresh one, is degraded with a continuous use. This means that the conversion ratio of the oxidation catalyst 600 decreases regardless of the temperature as the oxidation catalyst 600 becomes the Aged one with the continuous use. The conversion ratio profile Pa of the Aged one is basically the same as the conversion ratio profile Pf of the Fresh one in terms of a relationship between the conversion ratio in the adsorption area and the conversion ratio in the oxidation area, but has a lower conversion ratio than the conversion ratio profile Pf at the same temperature.

<Overview of Diagnosis of Degradation>

As described above, when the conversion ratio decreases to a level lower than a predetermined level as a result of the continuous use of the oxidation catalyst 600, the oxidation catalyst 600 cannot demonstrate its originally intended function. When the engine system 1000 is mounted on the vehicle, for example, the vehicle causes a problem of not meeting environmental criteria and the like. In the oxidation catalyst diagnostic system DS1 according to the present embodiment, whether the oxidation catalyst 600 as the Aged one is degraded to a problematic degree (e.g., replacement is required) is diagnosed based on a predetermined criterion, thereby to enable timely replacement of the oxidation catalyst 600 from the Aged one to the Fresh one in the engine system 1000.

It is conceptually possible that, by preparing in advance data (threshold data) corresponding to a threshold profile T as shown in FIG. 3, in which a threshold of the conversion ratio is set at each temperature, storing the data in the electronic controller 200 of the oxidation catalyst diagnostic system DS1, and obtaining the temperature and the conversion ratio of the oxidation catalyst 600 as a target of diagnosis, the oxidation catalyst 600 is diagnosed to be degraded when the obtained conversion ratio is lower than the threshold at the temperature.

To actually calculate the conversion ratio, however, the concentration of the unburned hydrocarbon gas is required to be obtained both at the location upstream from the oxidation catalyst 600 and at the location downstream from the oxidation catalyst 600, but the oxidation catalyst diagnostic system DS1 according to the present embodiment does not include the HC sensor at the location upstream from the oxidation catalyst 600. In the present embodiment, the degree of degradation of the oxidation catalyst 600 is diagnosed based on the downstream concentration Nl, the temperature of the oxidation catalyst 600, and the threshold data for the downstream concentration Nl, which uses the fact that the upstream concentration Nu of the oxidation catalyst 600 is in a certain range. The downstream concentration Nl is obtained based on the output value (HC detection signal sg11) from the HC sensor 100 provided at the location downstream from the oxidation catalyst 600. The temperature of the oxidation catalyst 600 is specified by the exhaust temperature detection signal sg12 from the temperature sensor 110 provided at the location upstream from the oxidation catalyst 600. The threshold data is determined in advance in accordance with the temperature and stored in the storage of the electronic controller 200. That is to say, diagnosis of degradation is performed treating the concentration of the unburned hydrocarbon gas of the exhaust gas G having passed through the oxidation catalyst 600 as a direct target of diagnosis. Specific details of diagnosis will be described below.

Figure 4A:
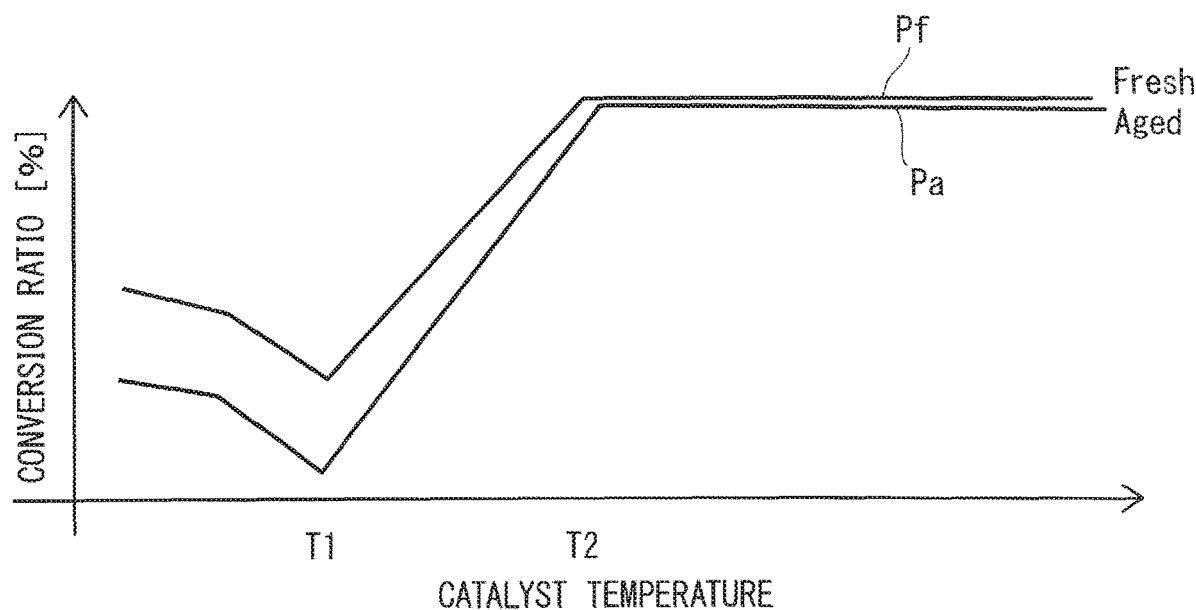
FIGS. 4A and 4B schematically show other examples of the conversion ratio profile.
Figure 4B:
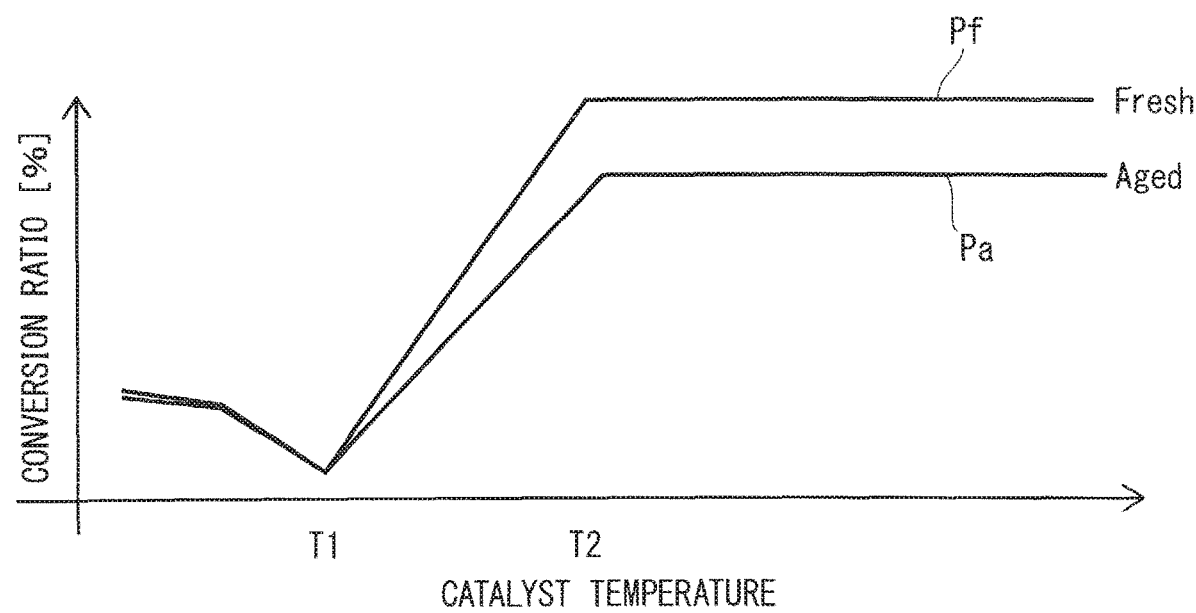

The conversion ratio profile Pa of the Aged one shown in FIG. 3 has a value lower than a value of the conversion ratio profile Pf by an approximately constant value at each temperature, but this is just an example of the conversion ratio profile Pa. FIGS. 4A and 4B schematically show other examples of the conversion ratio profile Pa. That is to say, the conversion ratio profile Pa of the Aged one may show a higher degree of degradation in the adsorption area than in the oxidation area as shown in FIG. 4A, and, in contrast, may show a higher degree of degradation in the oxidation area than in the adsorption area as shown in FIG. 4B. It is thus preferable to timely detect degradation caused in the temperature range equal to or lower than the temperature T1 in the case shown in FIG. 4A, and to timely detect degradation caused in the temperature range equal to or higher than the temperature T2 in the case shown in FIG. 4B.

<Specific Diagnostic Technique>

A specific technique of diagnosing the degree of degradation of the oxidation catalyst 600 in the oxidation catalyst diagnostic system DS1 according to the present embodiment will be described next. The diagnostic technique is broadly divided into two techniques, namely, Passive OBD and Active OBD. The two techniques are used appropriately for different purposes or used in combination, but the Passive OBD is performed in the present embodiment. This does not mean that the Active OBD cannot be performed in the oxidation catalyst diagnostic system DS1 according to the present embodiment, and the Active OBD may also be performed in the oxidation catalyst diagnostic system DS1.

In the present embodiment, generally speaking, the Passive OBD is a technique of making diagnosis using a state that the engine main body 300 in the normal operation state continuously exhausts the exhaust gas G through the exhaust pipe 500 as it is. Thus, the unburned hydrocarbon gas used in diagnosis with the Passive OBD is only the unburned hydrocarbon gas included in the exhaust gas G.

The Passive OBD can be performed at any timing as long as the engine main body 300 is in the normal operation state. Alternatively, the Passive OBD may automatically be performed intermittently or continuously in the oxidation catalyst diagnostic system DS1 without providing any particular instruction to perform the Passive OBD. The concentration of the unburned hydrocarbon gas to be detected by the HC sensor 100, however, does not exceed the concentration of the unburned hydrocarbon gas of the exhaust gas G exhausted from the engine main body 300, and thus the amount of detected unburned hydrocarbon gas tends to be small, especially in the oxidation area in which the conversion ratio is relatively high even in a case of the Aged one. In some cases, this point might have an effect on the accuracy of diagnosis.

Generally speaking, the Active OBD is a technique of intentionally injecting a small amount of fuel for a short period of time during operation of the engine main body 300 to generate a hydrocarbon gas for diagnosis, and making diagnosis using an atmosphere of the hydrocarbon gas thus formed for diagnosis as a target of diagnosis. This means that the atmosphere of the hydrocarbon gas used in diagnosis with the Active OBD is an atmosphere obtained by superimposing the hydrocarbon gas for diagnosis on the unburned hydrocarbon gas usually included in the exhaust gas G.

<Principle of Diagnosis with Passive OBD>

The principle of diagnosis with the Passive OBD performed in the oxidation catalyst diagnostic system DS1 according to the present embodiment will be described based on FIG. 5. This is adopted in diagnosis with the Passive OBD disclosed in Japanese Patent Application Laid-Open Publication No. 2016-108979. Although it is necessary to consider the variation of the oxygen concentration of the exhaust gas G in actual diagnosis as will be described below, assume herein that the oxygen concentration is constant, and there is no effect of the variation of the oxygen concentration.

Figure 5:
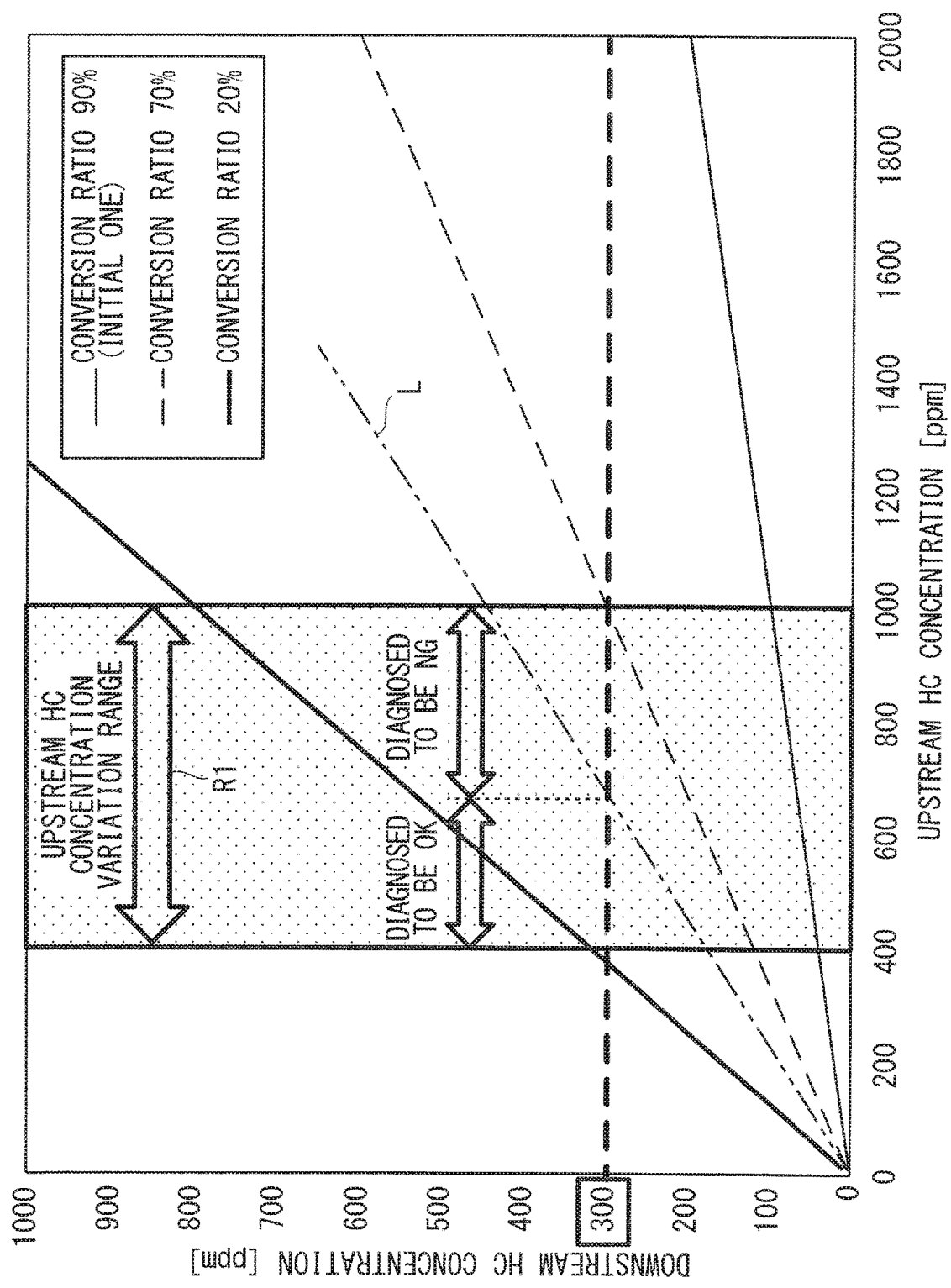
FIG. 5 shows, for some conversion ratios, a relationship between an upstream unburned hydrocarbon gas concentration Nu and a downstream unburned hydrocarbon gas concentration Nl when the temperature of an oxidation catalyst 600 is in an oxidation area higher than a temperature T2.

FIG. 5 shows, for some conversion ratios, a relationship between the upstream concentration Nu and the downstream concentration Nl when the temperature (hereinafter, referred to as a temperature Ta) of the oxidation catalyst 600 is in the oxidation area higher than the temperature T2. For example, the temperature Ta is 200° C.

The conversion ratio is defined by the above-mentioned Equation (1), and is thus a function of a slope of a straight line when the upstream concentration Nu is taken in the horizontal axis and the downstream concentration Nl is taken in the vertical axis as shown in FIG. 5. Specifically, the slope of the straight line decreases with increasing conversion ratio of the oxidation catalyst 600. In FIG. 5, the upstream concentration Nu is shown as UPSTREAM HC CONCENTRATION, and the downstream concentration Nl is shown as DOWNSTREAM HC CONCENTRATION.

In the present embodiment, a (an allowable) range of the conversion ratio in which it is determined that problematic degradation of the oxidation catalyst 600 is not caused is referred to as an allowable conversion ratio range. The allowable conversion ratio range may be determined arbitrarily in view of the state of the oxidation catalyst 600, but practically, only a lower limit value of the allowable conversion ratio range is determined arbitrarily, because an upper limit is usually 100%.

In FIG. 5 showing an example at the temperature Ta, the relationships between the upstream concentration Nu and the downstream concentration Nl for conversion ratios of 90%, 70%, and 20% are respectively indicated in a thin solid line, a broken line, and a thick solid line. Assume that an oxidation catalyst having a conversion ratio of 90% is a Fresh one at the temperature Ta. For example, in a case of the Fresh one having the conversion ratio of 90%, the downstream concentration Nl of the oxidation catalyst 600 is 100 ppm when the upstream concentration Nu of the oxidation catalyst 600 is 1000 ppm.

As described above, in the present embodiment, it is empirically known that, although the upstream concentration Nu always varies with operation state of the engine main body 300, the upstream concentration Nu varies approximately in a predetermined concentration range. In FIG. 5, a range of 400 ppm or more and 1000 ppm or less is a variation range (hereinafter, referred to as an upstream HC concentration variation range) R1 of the upstream concentration Nu. This means that, although a specific value of the upstream concentration Nu when diagnosis with the Passive OBD is made is not specified since it is not measured in the present embodiment, the value of the concentration can always be considered as a value in the upstream HC concentration variation range R1.

In a case of the temperature Ta shown in FIG. 5, it is assumed to be defined that problematic degradation of the oxidation catalyst 600 is not caused when the conversion ratio is 70% or more. In this case, the range of 70% or more is the allowable conversion ratio range. A measured value of the downstream concentration Nl of the oxidation catalyst 600 meeting the allowable conversion ratio range is 300 ppm or less. This is because, when the conversion ratio is 70% or more, a slope of a straight line corresponding to Equation (1) in FIG. 5 is always smaller than a slope of a straight line when the conversion ratio is 70% passing through a point (1000, 300).

This means that, if the threshold to be compared with the value of the downstream concentration Nl measured by the HC sensor 100 is determined to be 300 ppm, any oxidation catalyst 600 having an actual conversion ratio in the allowable conversion ratio range of 70% or more is surely diagnosed to be OK in the Passive OBD.

When the threshold is determined to be 300 ppm, a value of the downstream concentration Nl of any oxidation catalyst 600 having an actual conversion ratio of less than 20% is larger than 300 ppm regardless of a value of the upstream concentration Nu in the upstream HC concentration variation range R1. This means that, when the threshold is determined to be 300 ppm, any oxidation catalyst 600 having an actual conversion ratio of less than 20% is surely diagnosed to be NG in the Passive OBD.

In contrast, when the oxidation catalyst 600 has an actual conversion ratio of 20% or more and 70% or less at the temperature Ta as in a case of a straight line L indicated in an alternate long and two short dashes line in FIG. 5, for example, whether the oxidation catalyst 600 is diagnosed to be NG or OK in the Passive OBD is dependent on an actual value of the upstream concentration Nu, which is unclear when diagnosis is performed. More specifically, making the case the value of the downstream concentration Nl is 300 ppm as a border, the oxidation catalyst 600 is diagnosed to be OK when the value of the upstream concentration Nu is closer to 400 ppm because the value of the downstream concentration Nl is less than 300 ppm (in a range of less than 300 ppm of the straight line L), and is diagnosed to be NG when the value of the upstream concentration Nu is closer to 1000 ppm because the value of the downstream concentration Nl is 300 ppm or more (in a range of 300 ppm or more of the straight line L).

This means that the oxidation catalyst 600 might be diagnosed to be OK even when an actual conversion ratio of the oxidation catalyst 600 is lower than the lower limit value (70% at the temperature Ta) of the allowable conversion ratio range used as a reference when the threshold is determined for the downstream concentration Nl. However, it is estimated that, while the value of the upstream concentration Nu varies arbitrarily in the upstream HC concentration variation range R1, a range of the concentration where the oxidation catalyst 600 is diagnosed to be NG increases in the upstream HC concentration variation range R1, with decreasing actual conversion ratio. Therefore, the probability that the oxidation catalyst 600 will be diagnosed to be NG also increases as decreasing actual conversion ratio. It is thus considered that the oxidation catalyst 600 might be erroneously diagnosed to be OK with higher frequency when the actual conversion ratio is closer to the lower limit value of the allowable conversion ratio range used as the reference when the threshold is determined. This suggests that, while the threshold for diagnosis with the Passive OBD is determined in accordance with the allowable conversion ratio range that may arbitrarily be determined, there is a less problem in an actual use, as long as the threshold for the downstream concentration Nl is set to be smaller in advance (i.e., the conversion ratio providing the threshold is set to be higher), that is, the threshold is set in a safety side, even if some misdiagnosis might occur.

Alternatively, it is considered that, by repeatedly performing diagnosis as necessary even when the oxidation catalyst 600 happens to be erroneously diagnosed to be OK in the single diagnosis, the frequency with which (probability that) the oxidation catalyst 600 is diagnosed to be NG is increased with decreasing actual conversion ratio of the oxidation catalyst 600 due to degradation. The accuracy of detection in the actual use is thus considered to be increased by selecting diagnosis made repeatedly, storing the result of diagnosis in the storage (not illustrated) of the electronic controller 200 each time diagnosis is performed, and determining the degree of degradation of the oxidation catalyst 600 based on the stored result of diagnosis. For example, in diagnosis performed a predetermined number of times, the oxidation catalyst 600 may be diagnosed not to be degraded to the problematic degree when the frequency with which the oxidation catalyst 600 is diagnosed to be NG is a reference number of times or less, and diagnosed to be degraded to the problematic degree when the frequency with which the oxidation catalyst 600 is diagnosed to be NG exceeds the reference number of times. When diagnosis is made repeatedly, the temperature of the oxidation catalyst 600 can vary each time diagnosis is made, and thus the threshold to be used can vary each time diagnosis is made.

Alternatively, it is considered that, by performing diagnosis intermittently (over time) from the time when the oxidation catalyst 600 is the Fresh one, the oxidation catalyst 600, which is repeatedly diagnosed to be OK in the beginning, comes to be diagnosed to be NG, and accordingly, a timing at which the oxidation catalyst 600 is degraded can be known although the timing may vary to some degree.

Although a case where the temperature of the oxidation catalyst 600 is in the oxidation area higher than the temperature T2 is considered so far, a similar principle is applicable to a case where the temperature of the oxidation catalyst 600 is in the adsorption area lower than the temperature T1 and a case where the temperature of the oxidation catalyst 600 is in the intermediate area between the adsorption area and the oxidation area. The value of the threshold, however, is required to be determined in accordance with the temperature.

The above-mentioned description means that the degree of degradation of the oxidation catalyst 600 can be diagnosed with sufficiently high accuracy in practical use in light of required accuracy of diagnosis even when the threshold is set only for the downstream concentration Nl as in diagnosis with the Passive OBD performed in the present embodiment. In other words, degradation of the oxidation catalyst 600 can be diagnosed using the downstream concentration Nl as a diagnostic indicator value.

<Effect of Variation of Oxygen Concentration>

As described above, the principle of diagnosis of degradation of the oxidation catalyst 600 with the Passive OBD described based on FIG. 5 is only targeted at a case where the oxygen concentration of the exhaust gas G is constant, so to say, an ideal state.

Figure 6:
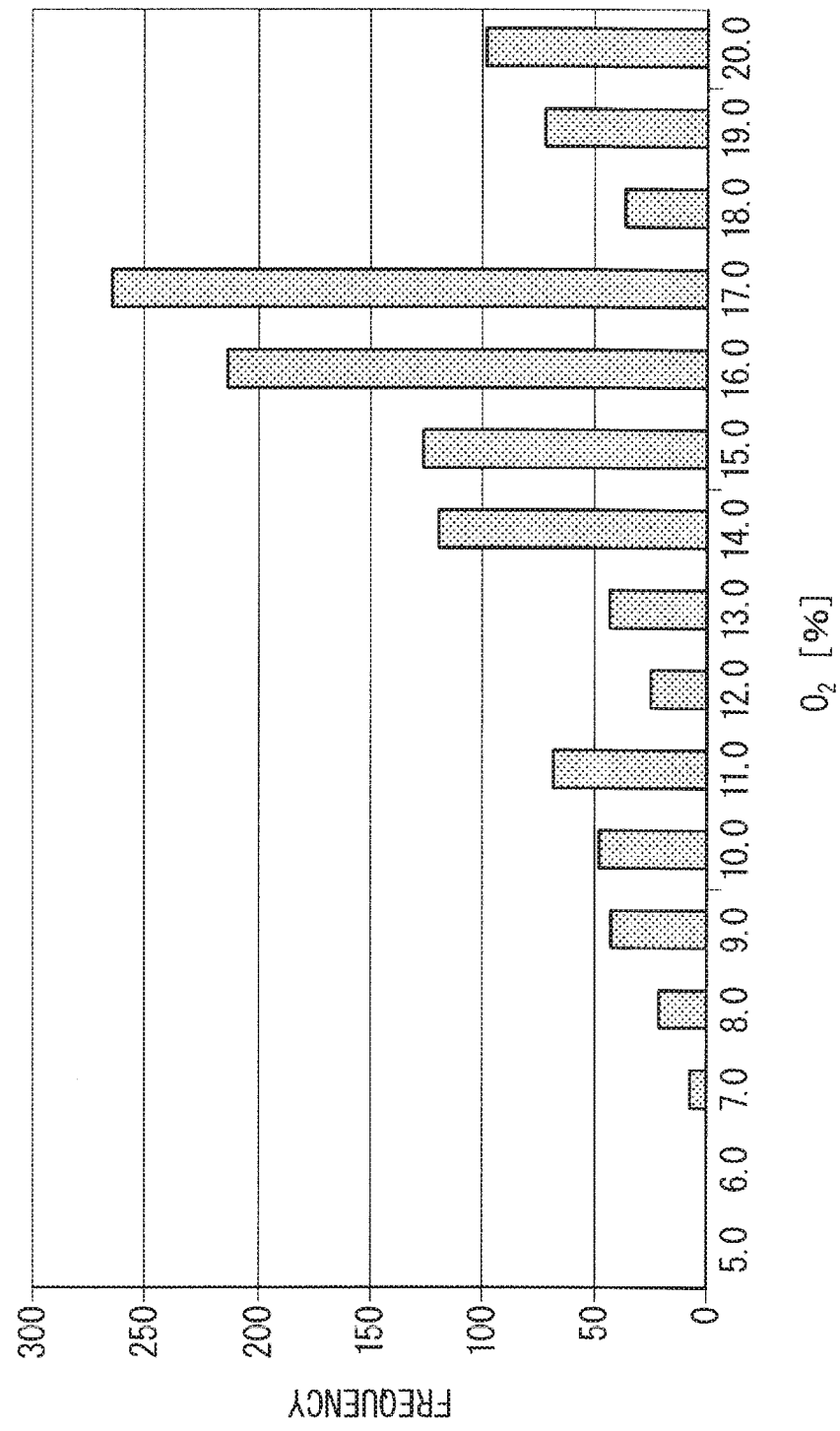
FIG. 6 shows distribution of an oxygen concentration of an exhaust gas G when a vehicle on which the engine system 1000 is mounted travels for a predetermined period of time in an NEDC mode.

In actuality, the concentration of oxygen of the exhaust gas G exhausted from the engine main body 300 that is the internal combustion engine, varies moment by moment. FIG. 6 shows distribution of the oxygen concentration of the exhaust gas G when the vehicle on which the engine system 1000 is mounted travels for a predetermined period of time in a new European driving cycle (NEDC) mode. More specifically, FIG. 6 is a histogram of a measured value obtained by measuring the oxygen concentration of the exhaust gas G during traveling at predetermined time intervals.

It can be seen from the histogram shown in FIG. 6 that, while the frequency is the highest in a range of an oxygen concentration value of 14% to 17% at steady-state traveling, the frequency is considerable in a range of the oxygen concentration value of 7% to 12% at acceleration and in a range of the oxygen concentration value of 18% to 20% at fuel cut. This indicates that the oxygen concentration of the exhaust gas G can vary at least in a range of 7% to 20%.

Figure 7:
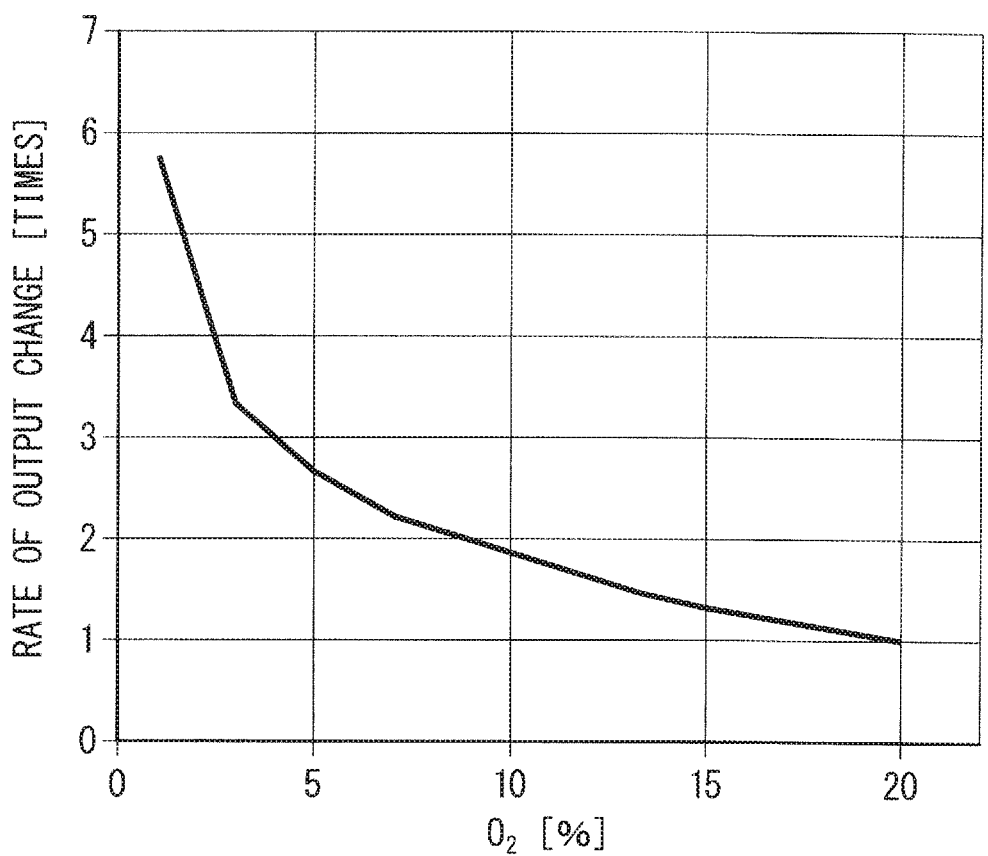
FIG. 7 shows the dependence of an output value from the HC sensor 100 on the oxygen concentration of the exhaust gas G.

FIG. 7 shows the dependence of the output value from the HC sensor 100 (corresponding to the hydrocarbon gas concentration) on the oxygen concentration of the exhaust gas G. Specifically, FIG. 7 is a diagram obtained by preparing a plurality of gases for evaluation having different oxygen concentrations in a range of 1% to 20% while having a fixed ethylene ($C_2H_4$) concentration as the hydrocarbon concentration of 500 ppm, detecting the hydrocarbon gas of each gas for evaluation using the HC sensor 100 to obtain an output value (a voltage value), and plotting a rate of change of the output value (rate of output change) obtained by normalizing the output value so that the output value when the oxygen concentration is 20% is one.

FIG. 7 suggests that, in the case that the oxygen concentration varies in a wide range as shown in FIG. 6, the output value from the HC sensor 100 might vary significantly and might deviate from a true value.

Figure 8:
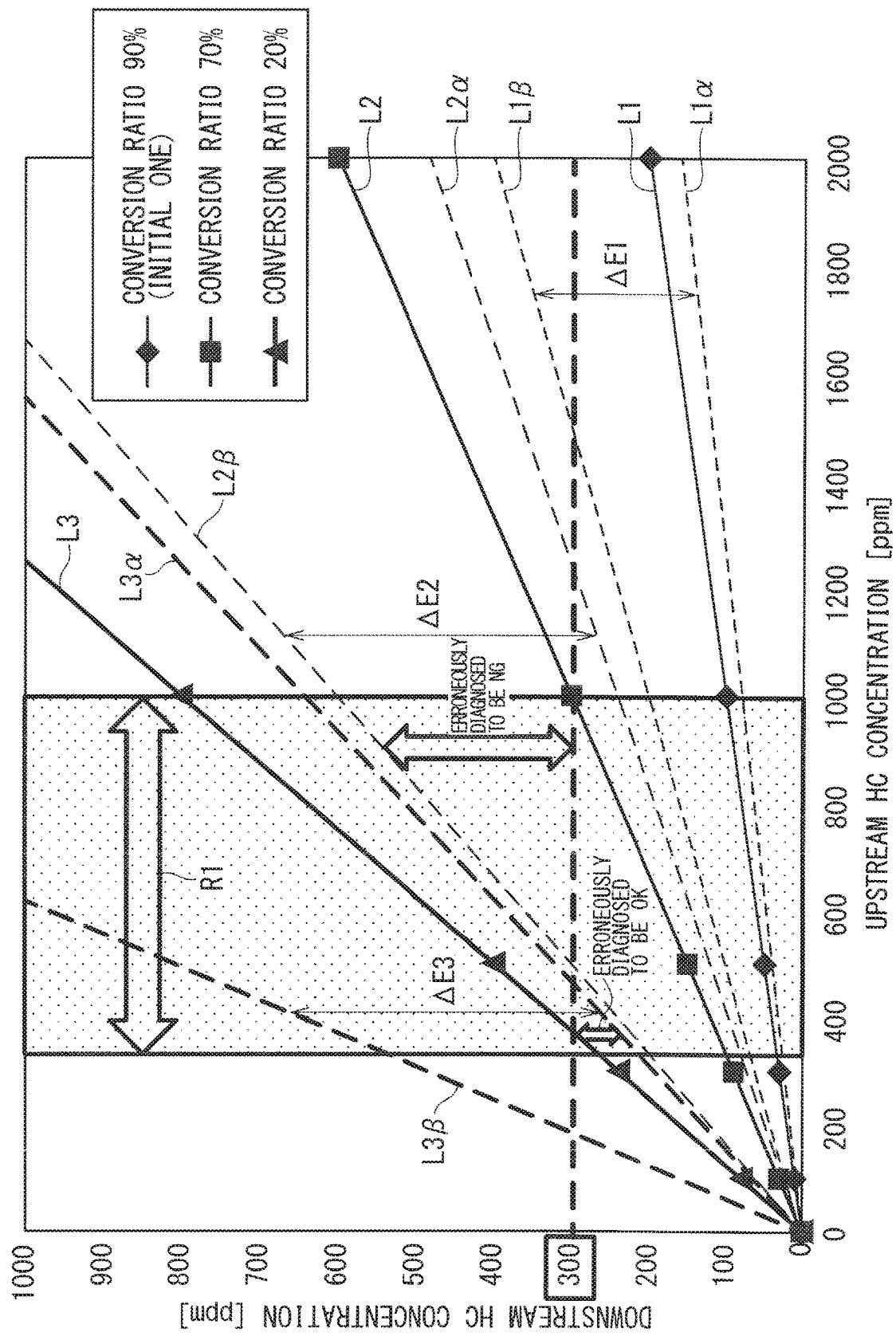
FIG. 8 shows the relationship between the upstream unburned hydrocarbon gas concentration Nu and the downstream unburned hydrocarbon gas concentration Nl for the three conversion ratios shown in FIG. 5 in consideration of the variation of the output value from the HC sensor 100 caused by the variation of the oxygen concentration of the exhaust gas G.

FIG. 8 shows the relationship between the upstream concentration Nu and the downstream concentration Nl for the three conversion ratios shown in FIG. 5 in consideration of the variation of the output value from the HC sensor 100 caused by the variation of the oxygen concentration of the exhaust gas G. FIG. 8 is based on the assumption that the oxygen concentration of the exhaust gas G varies in a range of 5% to 20%.

In FIG. 8, two broken lines L1α and L1β are respectively shown below and above a straight line L1 indicating the relationship between the upstream concentration Nu and the downstream concentration Nl when the conversion ratio of the oxidation catalyst 600 is 90%, which is indicated in the thin solid line in FIG. 5. This means that the value of the downstream concentration Nl, which originally has to be on the straight line L1, varies between the two broken lines L1α and L1β due to the variation of the oxygen concentration of the exhaust gas G. That is to say, a range ΔE1, in a vertical axis direction, between the two broken lines L1α and L1β is an error range of the downstream concentration Nl when the conversion ratio is 90%.

For example, in the case that the upstream concentration Nu is 2000 ppm, the downstream concentration Nl has to have a value of 200 ppm, but it can vary in a range of approximately 160 ppm to 400 ppm depending on the oxygen concentration of the exhaust gas G at the time in a case shown in FIG. 8.

Similarly, a range ΔE2 between two broken lines L2α and L2β is an error range of a straight line L2 indicating the relationship between the upstream concentration Nu and the downstream concentration Nl when the conversion ratio of the oxidation catalyst 600 is 70%, which is indicated in the broken line in FIG. 5, and a range ΔE3 between two broken lines L3α and L3β is an error range of a straight line L3 indicating the relationship between the upstream concentration Nu and the downstream concentration Nl when the conversion ratio of the oxidation catalyst 600 is 20%, which is indicated in the thick solid line in FIG. 5.

The locations of the broken lines L1α, L1β, L2α, L2β, L3α, and L3β shown in FIG. 8 are just examples, and an actual error range varies among individual oxidation catalyst diagnostic systems DS1.

Considering that the error range as described above underlies the value of the downstream concentration Nl which is the diagnostic indicator value in diagnosis of degradation, when the conversion ratio is 70%, for example, a range where the downstream concentration Nl exceeds 300 ppm is included in the error range ΔE2 for the case that the upstream concentration Nu of 500 ppm to 1000 ppm, which is included in the upstream HC concentration variation range R1. Therefore, even when the downstream concentration Nl is 300 ppm or less, which is the case that the oxidation catalyst 600 is surely diagnosed to be OK based on FIG. 5 not considering the error range of the value of the downstream concentration Nl, the oxidation catalyst 600 might erroneously be determined to be NG. The same applies to a case where the conversion ratio exceeds 70% as long as a range where the downstream concentration Nl exceeds 300 ppm is included in the error range.

In contrast, when the conversion ratio is 20%, the probability that the oxidation catalyst 600 is erroneously diagnosed to be OK is high despite that it originally has to be diagnosed to be NG due to the error range ΔE3. The same applies to a case where the conversion ratio falls below 20% as long as a range where the downstream concentration Nl is less than 300 ppm is included in the error range.

These indicate that the accuracy of diagnosis of degradation of the oxidation catalyst 600 with the Passive OBD is affected by the variation of the oxygen concentration of the exhaust gas G.

<Passive OBD in which Effect of Variation of Oxygen Concentration is Reduced>

As described above, diagnosis of degradation with the Passive OBD based on the principle shown in FIG. 5 is likely to be affected by the variation of the oxygen concentration of the exhaust gas G. In the present embodiment, in view of this, the oxygen concentration of the exhaust gas G when the diagnosis of degradation is performed is limited to meet a predetermined condition to reduce the error range of the downstream concentration Nl as the diagnostic indicator value, to thereby ensure the accuracy of diagnosis of degradation. In other words, measurement using the HC sensor 100 to diagnose degradation is performed only when the oxygen concentration is in a predetermined range, and diagnosis of degradation is performed based on a measured value obtained through the measurement in which the error range is reduced. In this case, the oxygen concentration of the exhaust gas G is specified based on the oxygen detection signal sg13 output from the oxygen concentration specification sensor 120.

Specifically, in view of the histogram shown in FIG. 6 and the rate of output change from the HC sensor 100 relative to the oxygen concentration shown in FIG. 7, diagnosis of degradation is performed only when the oxygen concentration of the exhaust gas G satisfies one of the following two conditions (oxygen concentration stability conditions):

Condition (a) the oxygen concentration is in a range of 15% to 20%; and

Condition (b) the oxygen concentration is 10% or more, and varies in a range of ±2% or less of a predetermined value in a predetermined period of time.

These two conditions for diagnosis of degradation are determined so that an increment of a maximum value relative to a minimum value in a target range of the rate of output change shown in FIG. 7 falls within 20% or less. In this case, an assumed error range of the downstream concentration Nl is suitably limited to a range of 20% at most.

Figure 9:
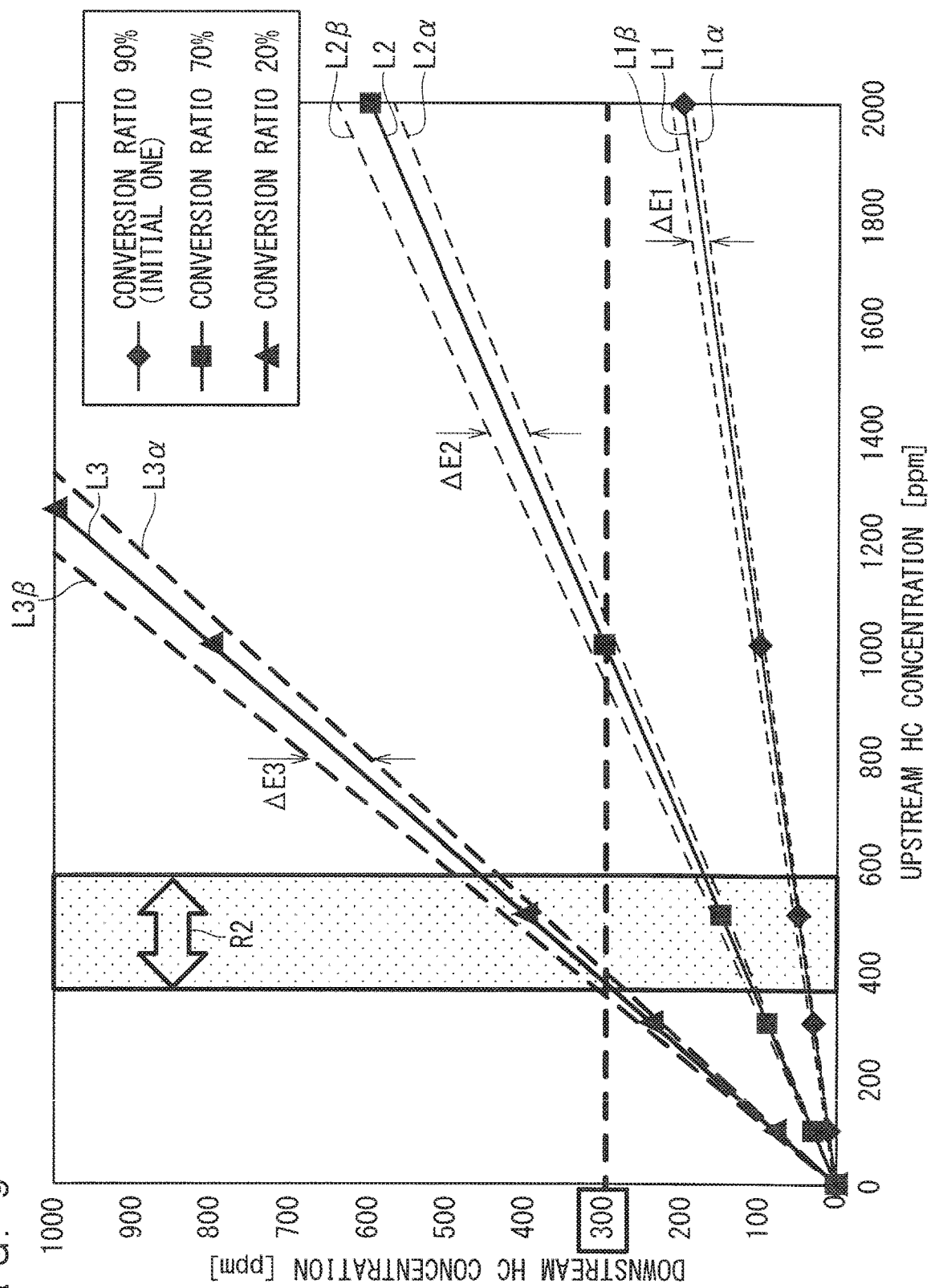
FIG. 9 shows the relationship between the upstream unburned hydrocarbon gas concentration Nu and the downstream unburned hydrocarbon gas concentration Nl for the three conversion ratios shown in FIG. 5 in consideration of a range of the variation of the oxygen concentration meeting (Condition b) of oxygen concentration stability conditions.

FIG. 9 shows the relationship between the upstream concentration Nu and the downstream concentration Nl for the three conversion ratios shown in FIG. 5 in consideration of a range of the variation of the oxygen concentration meeting Condition (b). Specifically, FIG. 9 is based on the assumption that the oxygen concentration varies in a range of 14% to 16% (15%±1%).

The error ranges ΔE1, ΔE2, and ΔE3 when the conversion ratios are respectively 90%, 70%, and 20% in this case are shown in FIG. 9, but each of these error ranges is approximately ±10% of the value indicated in the solid line, and is significantly smaller than the error range when the oxygen concentration varies in a range of 5% to 20%, which is shown in FIG. 8. This means that erroneous diagnosis caused by the variation of the oxygen concentration as in the case shown in FIG. 8 is less likely to occur.

In addition, when an operation condition of the engine system 1000 is adjusted to satisfy the above-mentioned conditions to diagnose degradation, an upstream HC concentration variation range R2 becomes more restrictive. In FIG. 9, a range of 400 ppm to 600 ppm, which is narrower than that shown in FIG. 8, is the upstream HC concentration variation range R2. As the upstream HC concentration variation range R2 becomes narrower, the possibility of probabilistic erroneous diagnosis that may occur in principle even when the oxygen concentration is constant, which is described based on FIG. 5, is more reduced.

In diagnosis of degradation with the Passive OBD according to the present embodiment, these two effects are superimposed to enable diagnosis on whether the oxidation catalyst 600 is degraded with stability and high accuracy compared with a case where the effect of the variation of the oxygen concentration is not considered.

<Example of Procedure for Diagnosis>

Figure 10:
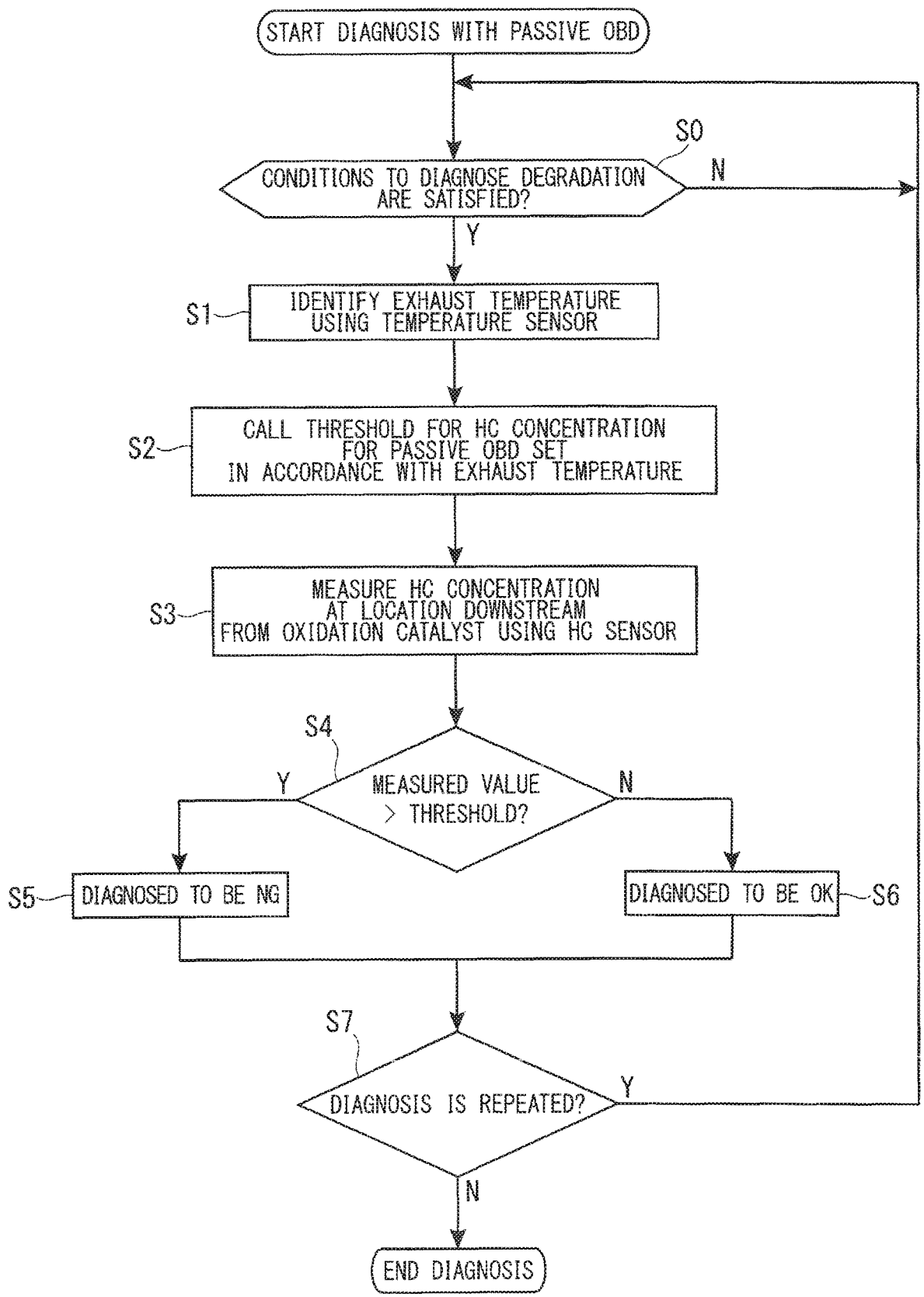
FIG. 10 shows an example of a procedure for diagnosis with Passive OBD.

FIG. 10 shows an example of a procedure for diagnosis with the Passive OBD performed in the present embodiment. Diagnosis with the Passive OBD performed in the present embodiment starts with the confirmation by the electronic controller 200 that the conditions to diagnose degradation including the above-mentioned oxygen concentration stability conditions are satisfied in a state where the engine system 1000 is operated (step S0). The conditions to diagnose degradation herein include the following three conditions:

First condition: the temperature of the oxidation catalyst 600 measured using the temperature sensor 110 is in a predetermined temperature range (e.g., 300° C. to 400° C.);

Second condition: the engine main body 300 is in a predetermined operation state (an operation condition including an engine speed, an air amount, an injection amount, an injection timing, and EGR meets a predetermined condition range); and Third condition: the oxygen concentration stability conditions are met.

The first condition may be determined based on the measured value from the temperature sensor 110, or may be satisfied automatically when the second condition is satisfied, by setting the first and second conditions so that the temperature of the oxidation catalyst 600 when the second condition is satisfied is in the temperature range determined by the first condition. In the former case, the electronic controller 200 obtains the exhaust temperature detection signal sg12 issued from the temperature sensor 110, thereby to specify the exhaust temperature. The exhaust temperature is treated as the temperature of the oxidation catalyst 600 at the time.

As long as the conditions to diagnose degradation are not satisfied (NO in step S0), the subsequent processing is suspended. When the conditions to diagnose degradation are satisfied (YES in step S0), the temperature of the exhaust gas G (exhaust temperature) at the time is identified (step S1).

Then, the electronic controller 200 calls the threshold for the unburned hydrocarbon gas concentration for Passive OBD corresponding to the exhaust temperature from the threshold data for Passive OBD stored in advance in the storage (step S2). The threshold is determined in advance at least for the upstream HC concentration variation range. There is no particular limitation on how to provide the threshold, and the threshold may be provided as a continuous function of the temperature of the oxidation catalyst 600 (exhaust temperature), or may be provided as a fixed value for each temperature range.

The downstream concentration Nl of the oxidation catalyst 600 is measured using the HC sensor 100 (step S3). More specifically, after the exhaust gas G having the specified temperature reaches the oxidation catalyst 600, and the unburned hydrocarbon gas is adsorbed or oxidized inside the oxidation catalyst 600, at a timing when the remaining gas is exhausted downstream from the oxidation catalyst 600, the electronic controller 200 obtains, as the HC detection signal sg11, the potential difference (HC sensor output) occurring between the detection electrode 10 and the reference electrode 20 of the HC sensor 100. And then, the electronic controller 200 calculates the downstream concentration Nl based on the value of the potential difference and the sensitivity characteristics of the HC sensor 100 specified in advance.

Identification of the exhaust temperature using the temperature sensor 110 and measurement of the downstream concentration Nl using the HC sensor 100 may be performed in parallel to each other.

After the downstream concentration Nl is measured and the threshold is called, the electronic controller 200 compares the measured value and the threshold (step S4). When the measured value is larger than the threshold (YES in step S4), the oxidation catalyst 600 is diagnosed to be degraded to a problematic degree (e.g., replacement is required) (NG) (step S5), and, when the threshold is larger than the measured value (NO in step S4), the oxidation catalyst 600 is diagnosed not to be degraded to such degree (OK) (step S6).

If diagnosis is further repeated after the end of diagnosis regardless of whether the oxidation catalyst 600 is diagnosed to be NG or OK (YES in step S7), processing is repeated from the confirmation of whether the conditions to diagnose degradation are satisfied. When diagnosis is not repeated, diagnosis ends (NO in step S7).

As described above, according to the present embodiment, the degree of degradation of the catalytic ability of the oxidation catalyst that is located along the exhaust pipe extending from the engine main body, which is the diesel engine, in the engine system, and oxidizes a predetermined gas component of the exhaust gas can be diagnosed with stability and high accuracy using the technique of the Passive OBD.

<Modifications>

Although the oxygen concentration is specified using the oxygen concentration specification sensor 120 located in the exhaust pipe 500 in the above-mentioned embodiment, a method of specifying the oxygen concentration to diagnose degradation is not limited to this method.

For example, when a fuel injection apparatus including the fuel injection valves 301 for the engine main body 300 is of a D-Jetronic type, the oxygen concentration is specified based on an intake air amount calculated from the pressure of an intake manifold and an engine speed.

Specifically, when $G_{air}$(g/s) denotes the intake air amount, $Q_{inj}$(g/s) denotes a fuel injection amount calculated from an energization time-injection amount characteristics, $AF_{st}$ denotes a stoichiometric A/F, and $\rho O_2$ (%) denotes the oxygen concentration of the atmospheric air, the oxygen concentration is expressed by the following Equation (2):

$$\text{oxygen concentration (\%)} = (G_{air} - Q_{inj} \times AF_{st}) \rho O_2 \quad \text{Equation (2)}$$

$AF_{st}$ is 14.5 in a case of the diesel engine, and $\rho O_2$ is 21% under standard atmospheric pressure.

When the fuel injection apparatus including the fuel injection valves 301 for the engine main body 300 is of an L-Jetronic type, the oxygen concentration can be specified by the Equation (2) using an intake air amount obtained by an air flow meter (AFM).

Alternatively, an intake air amount map showing the relationship between the position of the accelerator and the engine speed and the intake air amount may be prepared in advance, and the oxygen concentration may be specified by the Equation (2) using the intake air amount corresponding to values of the position of the accelerator and the engine speed at the time when diagnosis is performed, which is read from the intake air amount map.

When the oxygen concentration is specified by the Equation (2), the oxidation catalyst diagnostic system DS1 may not necessarily include the oxygen concentration specification sensor 120 to diagnose degradation. The oxygen concentration specification sensor 120, however, is sometimes used for another purpose in the engine system 1000, and thus there is no harm in including the oxygen concentration specification sensor 120 in this case.

In the oxidation catalyst diagnostic system DS1 according to the above-mentioned embodiment, the degree of degradation of the oxidation catalyst 600 is diagnosed using the downstream concentration Nl as the diagnostic indicator value without actually calculating the conversion ratio, but the degree of degradation of the oxidation catalyst 600 may be diagnosed by actually calculating the conversion ratio. This means that degradation may be diagnosed using the conversion ratio as the diagnostic indicator value.

Specifically, the HC sensor is provided not only at a location near the downstream side of the oxidation catalyst 600 as a target of diagnosis but also at a location near the upstream side of the oxidation catalyst 600, and the conversion ratio (%) is calculated from the Equation (1) using actually measured values of the upstream concentration Nu and the downstream concentration Nl, on the assumption that the conditions to diagnose degradation are satisfied. When the calculated value falls below the threshold as the lower limit value of the allowable conversion ratio range determined in advance, the oxidation catalyst 600 is determined to be degraded to a problematic degree (e.g., replacement is required), and, when the calculated value is the threshold or more, the oxidation catalyst 600 is determined not to be degraded to such degree. The threshold also in this case is determined in accordance with the temperature of the oxidation catalyst 600. The Equation (2) may be used to specify the oxygen concentration in this case.

This case is also based on the assumption that the oxygen concentration stability conditions are satisfied, and thus an error caused by the variation of the oxygen concentration is reduced in output values from the two HC sensors. The error caused by the variation of the oxygen concentration in conversion ratio calculated based on the Equation (1) is also reduced, and, as a result, diagnosis can be performed with high accuracy.

While the invention has been shown and described in detail, the foregoing description is in all aspects illustrative and not restrictive. It is therefore understood that numerous modifications and variations can be devised without departing from the scope of the invention.

What is claimed is:

1. A catalyst degradation diagnostic method of diagnosing a degree of degradation of a catalyst, said catalyst being located along an exhaust path of an internal combustion engine, and oxidizing or adsorbing a target gas included in an exhaust gas from said internal combustion engine, said target gas including at least one of a hydrocarbon gas and a carbon monoxide gas, said method comprising:

a) determining whether an oxygen concentration of said exhaust gas specified by a predetermined oxygen concentration specification component is in a range of 15% to 20% or whether said oxygen concentration of said exhaust gas is 10% or more and varies in a range of ±2% or less of a predetermined value in a predetermined period of time; and b) diagnosing whether said catalyst is degraded beyond an allowable degree at the time when it is determined in said step a) that said oxygen concentration of said exhaust gas is in said range of 15% to 20% or that said oxygen concentration of said exhaust gas is 10% or more and varies in said range of ±2% or less of said predetermined value in said predetermined period of time, said step b) being performed by comparing a diagnostic indicator value calculated using an output value from a target gas detection component and a threshold corresponding to a temperature of said catalyst, said target gas detection component being provided at least at a location downstream from said catalyst on said exhaust path and being capable of detecting said target gas.

2. The catalyst degradation diagnostic method according to claim 1, wherein a degree to which said catalyst oxidizes or adsorbs said target gas is expressed using a conversion ratio defined by an equation: conversion ratio (%)=100×(Nu−Nl)/Nu where Nu denotes a concentration of said target gas near an upstream side of said catalyst on said exhaust path, and Nl denotes a concentration of said target gas near a downstream side of said catalyst on said exhaust path, an allowable conversion ratio range is determined in advance in accordance with the temperature of said catalyst, said allowable conversion ratio range being a range of said conversion ratio allowed for said catalyst, said threshold is determined based on said allowable conversion ratio range, and in said step b), diagnosis is made using, as said diagnostic indicator value, a value of said Nl calculated based on said output value from said target gas detection component provided at said location downstream from said catalyst.

3. The catalyst degradation diagnostic method according to claim 2, wherein said oxygen concentration specification component includes an oxygen detection component located along said exhaust path and capable of detecting oxygen, and in said step a), said oxygen concentration of said exhaust gas is specified based on a detection signal output from said oxygen detection component in accordance with said oxygen concentration of said exhaust gas.

4. The catalyst degradation diagnostic method according to claim 2, wherein in said step a), said oxygen concentration of said exhaust gas is specified based on an intake air amount of said internal combustion engine.

5. The catalyst degradation diagnostic method according to claim 1, wherein said target gas detection component is provided both at a location upstream from said catalyst on said exhaust path and at a location downstream from said catalyst on said exhaust path, a degree to which said catalyst oxidizes or adsorbs said target gas is expressed using a conversion ratio defined by an equation: conversion ratio (%)=100·(Nu−Nl)/Nu where Nu denotes a concentration of said target gas near an upstream side of said catalyst on said exhaust path, and Nl denotes a concentration of said target gas near a downstream side of said catalyst on said exhaust path, an allowable conversion ratio range is determined in advance in accordance with the temperature of said catalyst, said allowable conversion ratio range being a range of said conversion ratio allowed for said catalyst, a lower limit value of said allowable conversion ratio range is determined as said threshold, and in said step b), diagnosis is made using, as said diagnostic indicator value, said conversion ratio calculated by substituting, into said equation, a value of said Nl calculated based on said output value from said target gas detection component provided at said location downstream from said catalyst and a value of said Nu calculated based on said output value from said target gas detection component provided at said location upstream from said catalyst.

6. The catalyst degradation diagnostic method according to claim 5, wherein said oxygen concentration specification component includes an oxygen detection component located along said exhaust path and capable of detecting oxygen, and in said step a), said oxygen concentration of said exhaust gas is specified based on a detection signal output from said oxygen detection component in accordance with said oxygen concentration of said exhaust gas.

7. The catalyst degradation diagnostic method according to claim 5, wherein in said step a), said oxygen concentration of said exhaust gas is specified based on an intake air amount of said internal combustion engine.

8. The catalyst degradation diagnostic method according to claim 1, wherein said oxygen concentration specification component includes an oxygen detection component located along said exhaust path and capable of detecting oxygen, and in said step a), said oxygen concentration of said exhaust gas is specified based on a detection signal output from said oxygen detection component in accordance with said oxygen concentration of said exhaust gas.

9. The catalyst degradation diagnostic method according to claim 1, wherein in said step a), said oxygen concentration of said exhaust gas is specified based on an intake air amount of said internal combustion engine.

10. A catalyst degradation diagnostic system for diagnosing a degree of degradation of a catalyst, said catalyst being located along an exhaust path of an internal combustion engine, and oxidizing or adsorbing a target gas included in an exhaust gas from said internal combustion engine, said target gas including at least one of a hydrocarbon gas and a carbon monoxide gas, said system comprising:

an oxygen concentration specification component capable of specifying an oxygen concentration of said exhaust gas;

a target gas detection component provided at least at a location downstream from said catalyst on said exhaust path, and capable of detecting said target gas;

a controller configured to control said catalyst degradation diagnostic system; and a storage storing threshold data, wherein said threshold data describes a threshold used in diagnosis of degradation of said catalyst in accordance with a temperature of said catalyst, and is determined in advance and held in said storage, and when said oxygen concentration of said exhaust gas specified by said oxygen concentration specification component is in a range of 15% to 20% or said oxygen concentration of said exhaust gas is 10% or more and varies in a range of ±2% or less of a predetermined value in a predetermined period of time, said controller diagnoses whether said catalyst is degraded beyond an allowable degree by comparing a diagnostic indicator value calculated using an output value from said target gas detection component and said threshold corresponding to said temperature of said catalyst described in said threshold data.

11. The catalyst degradation diagnostic system according to claim 10, wherein
a degree to which said catalyst oxidizes or adsorbs said target gas is expressed using a conversion ratio defined by an equation:

conversion ratio (%)=100·($Nu-Nl$)/$Nu$ where Nu denotes a concentration of said target gas near an upstream side of said catalyst on said exhaust path, and Nl denotes a concentration of said target gas near a downstream side of said catalyst on said exhaust path,
an allowable conversion ratio range is determined in advance in accordance with the temperature of said catalyst, said allowable conversion ratio range being a range of said conversion ratio allowed for said catalyst,
said threshold is determined based on said allowable conversion ratio range, and
diagnosis is made using, as said diagnostic indicator value, a value of said Nl calculated based on said output value from said target gas detection component provided at said location downstream from said catalyst.

12. The catalyst degradation diagnostic system according to claim 11, further comprising
an oxygen detection component located along said exhaust path and capable of detecting oxygen; and
said oxygen concentration specification component specifies said oxygen concentration of said exhaust gas based on a detection signal output from said oxygen detection component in accordance with said oxygen concentration of said exhaust gas.

13. The catalyst degradation diagnostic system according to claim 11, wherein
said oxygen concentration specification component specifies said oxygen concentration of said exhaust gas based on an intake air amount of said internal combustion engine.

14. The catalyst degradation diagnostic system according to claim 10, wherein
said target gas detection component is provided both at a location upstream from said catalyst on said exhaust path and at a location downstream from said catalyst on said exhaust path,
a degree to which said catalyst oxidizes or adsorbs said target gas is expressed using a conversion ratio defined by an equation:

conversion ratio (%)=100·($Nu-Nl$)/$Nu$ where Nu denotes a concentration of said target gas near an upstream side of said catalyst on said exhaust path, and Nl denotes a concentration of said target gas near a downstream side of said catalyst on said exhaust path,
an allowable conversion ratio range is determined in advance in accordance with the temperature of said catalyst, said allowable conversion ratio range being a range of said conversion ratio allowed for said catalyst,
a lower limit value of said allowable conversion ratio range is determined as said threshold, and
diagnosis is made using, as said diagnostic indicator value, said conversion ratio calculated by substituting, into said equation, a value of said Nl calculated based on said output value from said target gas detection component provided at said location downstream from said catalyst and a value of said Nu calculated based on said output value from said target gas detection component provided at said location upstream from said catalyst.

15. The catalyst degradation diagnostic system according to claim 14, further comprising
an oxygen detection component located along said exhaust path and capable of detecting oxygen and
said oxygen concentration specification component specifies said oxygen concentration of said exhaust gas based on a detection signal output from said oxygen detection component in accordance with said oxygen concentration of said exhaust gas.

16. The catalyst degradation diagnostic system according to claim 14, wherein
said oxygen concentration specification component specifies said oxygen concentration of said exhaust gas based on an intake air amount of said internal combustion engine.

17. The catalyst degradation diagnostic system according to claim 10, further comprising
an oxygen detection component located along said exhaust path and capable of detecting oxygen; and
said oxygen concentration specification component specifies said oxygen concentration of said exhaust gas based on a detection signal output from said oxygen detection component in accordance with said oxygen concentration of said exhaust gas.

18. The catalyst degradation diagnostic system according to claim 10, wherein
said oxygen concentration specification component specifies said oxygen concentration of said exhaust gas based on an intake air amount of said internal combustion engine.

* * * * *